United States Patent [19]
Yokev et al.

[11] Patent Number: 5,596,330
[45] Date of Patent: Jan. 21, 1997

[54] DIFFERENTIAL RANGING FOR A FREQUENCY-HOPPED REMOTE POSITION DETERMINATION SYSTEM

[75] Inventors: Hanoch Yokev, Ramat-Gan; Shimon Peleg, Hod Hasharon; Yehouda Meiman, Rishon Letzian; Boaz Porat, Haifa, all of Israel

[73] Assignee: Nexus Telecommunication Systems Ltd., Givatayim, Israel

[21] Appl. No.: 389,263

[22] Filed: Feb. 16, 1995

Related U.S. Application Data

[63] Continuation-in-part of Ser. No. 329,549, Oct. 26, 1994, Pat. No. 5,592,180, which is a continuation-in-part of Ser. No. 329,523, Oct. 26, 1994, Pat. No. 5,583,517, each is a continuation-in-part of Ser. No.158,441, Nov. 24, 1993, Pat. No. 5,430,759, which is a continuation-in-part of Ser. No. 961,776, Oct. 15, 1992, Pat. No. 5,335,246, which is a continuation-in-part of Ser. No. 140,716, Oct. 21, 1993, Pat. No. 5,379,047.

[51] Int. Cl.$^6$ ............................................. G01S 1/24
[52] U.S. Cl. ........................... 342/387; 342/457; 342/465
[58] Field of Search ................................. 342/387, 394, 342/450, 457, 465, 393

[56] References Cited

U.S. PATENT DOCUMENTS

| | | |
|---|---|---|
| 2,437,695 | 3/1948 | Jansky . |
| 3,445,847 | 5/1969 | Hammack . |
| 3,747,104 | 7/1973 | Pansini . |
| 3,864,681 | 2/1975 | Olive ........................................ 343/112 |
| 3,886,554 | 5/1975 | Braun et al. ............................. 343/112 |
| 3,972,042 | 7/1976 | Johnson ................................. 343/17.2 |
| 4,114,155 | 9/1978 | Raab ......................................... 343/105 |
| 4,188,629 | 2/1980 | Johnson .................................... 343/6.5 |
| 4,217,586 | 8/1980 | McGuffin .................................. 343/100 |
| 4,229,620 | 10/1980 | Schaible ....................................... 179/2 |
| 4,369,426 | 1/1983 | Merkel ........................................ 340/32 |
| 4,449,127 | 5/1984 | Sanchez ....................................... 343/7 |

(List continued on next page.)

FOREIGN PATENT DOCUMENTS

| | | |
|---|---|---|
| 0583523 | 2/1994 | European Pat. Off. . |
| 9001089 | 4/1992 | France . |
| 58-28675 | 2/1983 | Japan . |
| WO83/00563 | 2/1983 | WIPO . |
| WO88/01750 | 3/1988 | WIPO . |
| WO89/12835 | 12/1989 | WIPO . |

OTHER PUBLICATIONS

Ernest Jacobs et al., "Ambiguity Resolution in Interferometry," *IEEE Transactions on Aerospace and Electronic Systems,* 17, No. 6, pp. 776/780, dated Nov. 1981.

Mati Wax, et al., "Decentralized Processing in Sensory Arrays," *IEEE Transactions on Acoustics, Speech and Signal Processing, ASSP-33,* No. 4, pp. 1123–1129, dated Oct. 1985.

*Primary Examiner*—Theodore M. Blum
*Attorney, Agent, or Firm*—Schwegman, Lundberg, Woessner & Kluth, P.A.

[57] ABSTRACT

A differential ranging location system is described which uses a modified time-of-arrival technique to determine the location of a frequency hopped spread spectrum radio signal. The transmitter simultaneously transmits two radio frequency carriers having different frequencies such that a phase difference is observed between the two carriers at a distance from the transmitter. The phase difference is proportional to the range from the transmitter that the carrier signals are observed. The two carrier signals from the single transmitter are received by at least three and in special cases four base stations which calculate the differential time of arrival based on the phase differences of the received carriers. The calculated phase differences are then sent to a central location which locates the position of the transmitter based upon a planer hyperbolic location algorithm. Since a large number of narrow band frequencies across a wide spectrum are used in a frequency hopping transmission protocol, the accuracy in determining the phase differences between the two carriers is increased and the immunity to interference is also increased.

7 Claims, 11 Drawing Sheets

U.S. PATENT DOCUMENTS

| | | | |
|---|---|---|---|
| 4,494,119 | 1/1985 | Wimbush | 343/457 |
| 4,589,078 | 5/1986 | Rosenberg | 364/524 |
| 4,596,988 | 6/1986 | Wanka | 343/457 |
| 4,665,379 | 5/1987 | Howell et al. | 340/63 |
| 4,665,404 | 5/1987 | Christy et al. | 342/463 |
| 4,698,781 | 10/1987 | Cockerell, Jr. | 364/561 |
| 4,728,959 | 3/1988 | Maloney et al. | 342/457 |
| 4,740,792 | 4/1988 | Sagey et al. | 342/457 |
| 4,742,357 | 5/1988 | Rackley | 342/457 |
| 4,791,572 | 12/1988 | Green, III et al. | 364/449 |
| 4,891,650 | 1/1990 | Sheffer | 342/457 |
| 4,905,271 | 2/1990 | Namekawa | 379/58 |
| 5,003,317 | 3/1991 | Gray et al. | 342/457 |
| 5,021,794 | 6/1991 | Lawrence | 342/457 |
| 5,055,851 | 10/1991 | Sheffer | 342/457 |
| 5,081,667 | 1/1992 | Drori et al. | 379/59 |
| 5,099,245 | 3/1992 | Sagey | 342/357 |
| 5,150,310 | 9/1992 | Greenspun et al. | 364/516 |
| 5,166,694 | 11/1992 | Russell et al. | 342/457 |
| 5,191,342 | 3/1993 | Alsup et al. | 342/465 |
| 5,216,429 | 6/1993 | Nakagawa et al. | 342/450 |
| 5,218,367 | 6/1993 | Sheffer et al. | 342/457 |
| 5,311,197 | 5/1994 | Sorden et al. | 342/457 |
| 5,317,323 | 5/1994 | Kennedy et al. | 342/457 |
| 5,327,144 | 7/1994 | Stilp et al. | 342/387 |
| 5,365,451 | 11/1994 | Wang et al. | 364/449 |
| 5,365,516 | 11/1994 | Jandrell | 370/18 |
| 5,372,411 | 12/1994 | Gerstenmaier et al. | 303/100 |
| 5,379,047 | 1/1995 | Yokev et al. | 342/457 |
| 5,396,540 | 3/1995 | Gooch | 379/59 |
| 5,500,648 | 3/1996 | Maine et al. | 342/357 |

5,596,330

DIFFERENTIAL RANGING FOR A FREQUENCY-HOPPED REMOTE POSITION DETERMINATION SYSTEM

The present patent application is a continuation-in-part of U.S. patent application Ser. No. 08/329,549 entitled "DIRECTION FINDING AND MOBILE LOCATION SYSTEM FOR SPECIAL MOBILE RADIO SYSTEMS" filed Oct. 26, 1994 now U.S. Pat. No. 5,592,180, which is a continuation-in-part of U.S. patent application Ser. No. 08/329,523 entitled "MULTIPATH-RESISTANT FREQUENCY-HOPPED SPREAD SPECTRUM MOBILE LOCATION SYSTEM" filed Oct. 26, 1994 now U.S. Pat. No. 5,583,517, which are both continuations-in-part of U.S. patent application Ser. No. 08/158,441 entitled "LOW-POWER FREQUENCY-HOPPED SPREAD SPECTRUM REVERSE PAGING SYSTEM" filed Nov. 24, 1993, which in turn is a continuation-in-part of Ser. No. 961,776, now U.S. Pat. No. 5,335,246 entitled "PAGER WITH REVERSE PAGING FACILITY" issued Aug. 2, 1994, which in turn is a continuation-in-part of Ser. No. 140,716, now U.S. Pat. No. 5,379,047 entitled "REMOTE POSITION DETERMINATION" issued Jan. 3, 1995, all of which, including the microfiche appendices, are hereby incorporated by reference and which are all commonly assigned.

FIELD OF THE INVENTION

The present patent application relates to radio communication and transmitter location system.

BACKGROUND OF THE INVENTION

Location of radio transmitters is a technology that has been used for many years and in many applications. For radio location, the use of mobile transmitters and a plurality of fixed base station receivers is generally known in the art where the fixed receivers locate the source of the radio signal by triangulation of the radio signals. Triangulation is a technique where a plurality of fixed base station receivers each determine the approximate direction of the radio signal from the transmitter. The approximate direction lines are then drawn on a map and the location of the transmitter is defined at the cross point of these lines. Since the direction lines are approximate, and typically three fixed base station receivers are used, the intersecting area between the three lines is usually shaped like a triangle since the lines rarely meet at a single point. The transmitter is then located within the triangle.

Triangulation of radio signals is a costly undertaking since at least two receiving antenna stations must be situated at different diverse geographic locations to perform even rudimentary triangulation. Effective triangulation is more realistically achieved with three receiving locations and accuracy is increased even more with four receiving towers. The more receiving stations constructed, the better the accuracy in locating the transmitter, but also the great the cost.

One such direction finding technique is described in one of the patent applications of the present invention, U.S. patent application Ser. No. 08/329,523 entitled "MULTIPATH-RESISTANT FREQUENCY-HOPPED SPREAD SPECTRUM MOBILE LOCATION SYSTEM" filed Oct. 26, 1994, which is not prior art to the present invention. In that patent application, the direction of the incoming radio signal is determined by using an array of receiving antennas to measure the phase difference between the antennas of the array and thereby calculate the incident direction of the radio carrier signal. Although the parent patent application has many novel and useful advantages, it requires that each base station use an array of antennas and at least two and typically three bases. Quite often the cost of building and maintaining these base stations can be quite high, especially if they are located in urban areas where roof-top space must be leased and the cost of the lease is determined by the number of antennas placed thereon.

Another disadvantage of triangulation for location of radio transmitters is the construction of such a system in sparsely-populated areas. In the example of a highway across a desert area, it is cost prohibitive to install a large number of base stations to track a narrow stretch of road. The base stations would have to be placed on both sides of the road and spaced quite far back from the road.

There is a need in the art to locate a radio transmitter using at least three and in special cases four one-antenna receivers. A receiver with one antenna will minimize the construction and lease costs of a location system. There is a further need in the art to determine the location of low power, frequency hopped spread spectrum radio transmitter.

SUMMARY OF THE INVENTION

The present invention solves the above-mentioned problems with locating transmitters and other problems which will be understood by those skilled in the art upon reading and understanding the present specification. The present invention uses a modified time-of-arrival technique to determine the location of a frequency hopped spread spectrum radio signal. The transmitter simultaneously transmits two radio frequency carriers having different frequencies such that a phase difference is observed between the two carriers at a distance from the transmitter. The phase difference is proportional to the range from the transmitter that the carrier signals are observed. The two carrier signals from the single transmitter are received by at least three and in special cases four base stations which calculate the differential time of arrival based on the phase differences of the received carriers. The calculated phase differences are then sent to a central location which locates the position of the transmitter based upon a planer hyperbolic location algorithm. Since a large number of narrow band frequencies across a wide spectrum are used in a frequency hopping transmission protocol, the accuracy in determining the phase differences between the two carriers is increased and the immunity to interference is also increased.

BRIEF DESCRIPTION OF THE DRAWINGS

In the drawings, where like numerals refer to like components throughout the several views.

DETAILED DESCRIPTION OF THE PREFERRED EMBODIMENT

Figure 1:
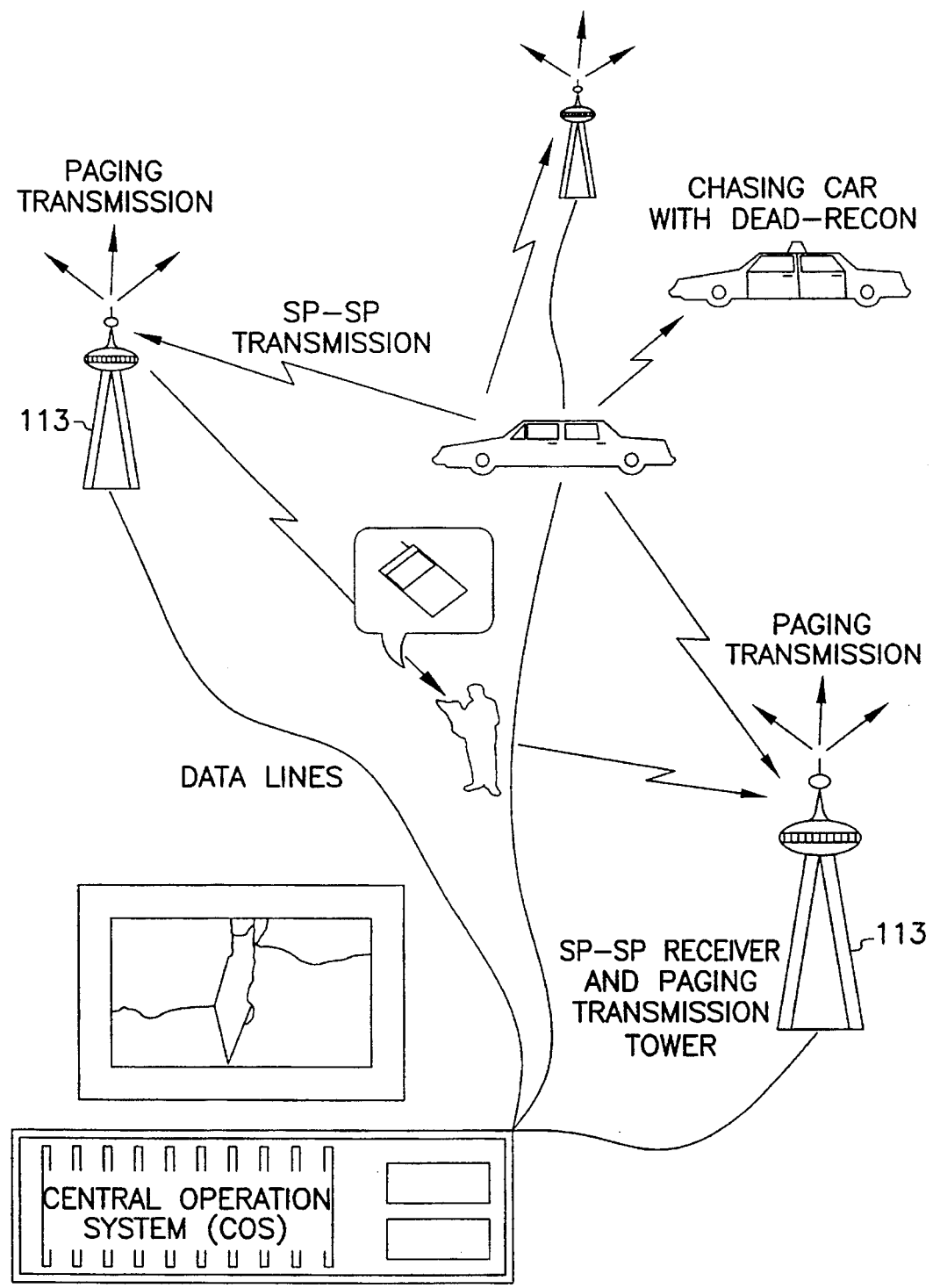
FIG. 1 is a diagram of an integrated frequency hopping spread spectrum communication and location system.

The specification for the present invention described herein includes the present description, the drawings, and claims. The present specification also includes the descriptions, drawings, appendices and claims as filed of U.S. patent application Ser. No. 08/329,549 entitled "DIRECTION FINDING AND MOBILE LOCATION SYSTEM FOR SPECIAL MOBILE RADIO SYSTEMS" filed Oct. 26, 1994, U.S. patent application Ser. No. 08/329,523 entitled "MULTIPATH-RESISTANT FREQUENCY-HOPPED SPREAD SPECTRUM MOBILE LOCATION SYSTEM" filed Oct. 26, 1994, U.S. patent application Ser. No. 08/158,441 entitled "LOW-POWER FREQUENCY-HOPPED SPREAD SPECTRUM REVERSE PAGING SYSTEM" filed Nov. 24, 1993, U.S. Pat. No. 5,335,246 entitled "PAGER WITH REVERSE PAGING FACILITY" issued Aug. 2, 1994, and U.S. Pat. No. 5,379,047 entitled "REMOTE POSITION DETERMINATION" issued Jan. 3, 1994, all of which are hereby incorporated by reference and none of which are prior art to the present invention.

In the following detailed description of the preferred embodiment, reference is made to the accompanying drawings which form a part hereof, and in which is shown by way of illustration specific preferred embodiments in which the inventions may be practices. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

System Overview

In the preferred embodiment of the present invention, the base stations and central site of the present invention are similar to the base stations and central site described in the aforementioned copending continuation-in-part of U.S. patent application Ser. No. 08/329,523 entitled "MULTI-PATH-RESISTANT FREQUENCY-HOPPED SPREAD SPECTRUM MOBILE LOCATION SYSTEM," filed Oct. 26, 1994, and the processing structure of this location system operates similarly to the present system. The present invention allows the accurate location of the frequency hopped, spread spectrum transmitters even in noisy and multi-path environments such as those found in urban environments and irregular terrain environments.

The present invention is direct to a location system for use in locating remote mobile units (RMU's). The remote mobile units may be located in motor vehicles, located on the person of people, carried within containers or packages, or any number or variety of mobile carriers. The location system comprises a plurality of base stations (at least three and in special cases four) which can transmit signals to the remote mobile units and receive signals from the remote mobile units. The base stations may send messages and information to the remote mobile units, the base stations may send alert or interrogation commands to activate the remote mobile units, or the remote mobile units may be activated locally without any prompting. Thus the remote mobile units may be activated locally (for example by the wearer or vehicle) or remotely by the base station. The remote mobile units may be used by a person as a reverse pager, as an emergency locator or as a communication device. The remote mobile units may also be used as part of a vehicle to locate the vehicle if stolen, for vehicle tracking or as an integral communication device. The remote mobile unit may also be activated in the case of an accident by a deceleration switch, ABS system, air-bag or other crash-activated switch to automatically summon help.

The remote mobile units receive messages as a standard paging device over licensed airwaves using a standard paging infrastructure. The remote mobile units, when activated, transmit low-power (less than one watt), frequency-hopped, spread-spectrum communication signals. The transmitted signals from the remote mobile units are received by the base stations which are then used to locate the remote mobile units. The base stations are equipped with a single receiving antenna. The location of the remote mobile units is determined by differential ranging using phase difference comparisons between two carrier signals simultaneously transmitted by the remote mobile unit. Unique algorithms are performed on the received signals at the base stations to eliminate the ambiguity caused by signal interference, phase ambiguity caused by errors and noise and multi-path reflections.

The frequency hopping transmitter of the remote mobile unit produces two sine waves for each frequency hop. The phase difference between the two sine waves will vary with distance from the transmitter which is proportional to the range from the transmitter. There is an ambiguity factor in the range determination due to the phase differences between the two sine waves. The ambiguity is minimized by transmitting at least 53 hops per transmitted message so that there is a different phase difference within each frequency hop. Each hop change produces a step in frequency such that 53 steps of various step distances in frequency are produced.

At the receiver, the frequency hopping carriers are down-converted, sampled and digitized for processing in the digital domain. A range calculation is determined by comparing the phase differences of the two sine waves of the two frequencies within each hop. The ambiguities are minimized by comparing the phase differences across the 53 hops in synchrony with the hopping protocol. The differential range between two bases is determined by collecting the phase differences from all the hops in two bases and performing in the central station an Inverse Fourier Transform (IFT) which will produce a single value for the differential range between the two bases to the transmitter.

Each base station is equipped with a very accurate rubidium atomic clock so that the exact time of arrival of the frequency hopping signals is determined with reference to a very accurate standard time. Those skilled in the art will readily recognize that any highly-accurate clock means may be substituted for the preferred rubidium clock such as a GPS receiver. The central station compares the time of arrivals with the knowledge that each base station has made its calculations based on the same time standard. The time of arrival information is then used to plot possible locations of the transmitter using a hyperbolic plot. The comparison of the time of arrivals from two base stations will produce a hyperbolic plot where the base stations are the foci. By plotting the time of arrival numbers on the hyperbolic plot and crossing the hyperbolic plots between two or more base stations, the exact location of the transmitter can be determined.

To assist in calibrating the differential ranging system with the local base stations, a transmitter having a known location is used to periodically transmit a signal which is then used to synchronize the base stations. The calibration signals is used to adjust the local atomic clocks of the base stations. It is possible to use less accurate clocks in the present system by increasing the number of calibrations performed in a day. In a calibrated system the accuracy of location has been measured at 26 meters at minimum received signal strength of −138 dbm when operating within the parameters described below.

The problems associated with multipath reflections and fading can also be minimized by the use of the techniques described in the copending and commonly assigned U.S. patent application Ser. No. 08/329,523 entitled "MULTI-PATH-RESISTANT FREQUENCY-HOPPED SPREAD SPECTRUM MOBILE LOCATION SYSTEM" filed Oct. 26, 1994, The multi-path problems and fading problems are usually frequency dependent so that use of a large number of frequency hops virtually eliminates these problems. The ambiguity problems are also solved in a fashion similar to that described in the aforementioned copending patent application.

Summary of Hyperbolic Location with Differential Time of Arrival

The operation of the present differential ranging invention may also be termed differential time-of-arrival (TOA) since the differences in the arrival times at the base stations are used to determine the position of the receiver. As is described in more detail below, the TOA of the two carrier frequency signals for each remote mobile unit are estimated at each base station for each hop. The TOA is proportional to the range R of the signals.

The operation of the present system is basically performed in two major steps. In the first step, estimated range $R_n$ is determined for each base station $BS_n$, where n is the base station number. Due to the inaccuracy of the clock in the transmitter, the range by itself is not an accurate indicator of the distance of the remote mobile unit from the transmitter. Since the base stations are equipped with very accurate clocks which are periodically synchronized to a common time base, the base stations can report the exact time of arrival of the signals.

Figure 5:
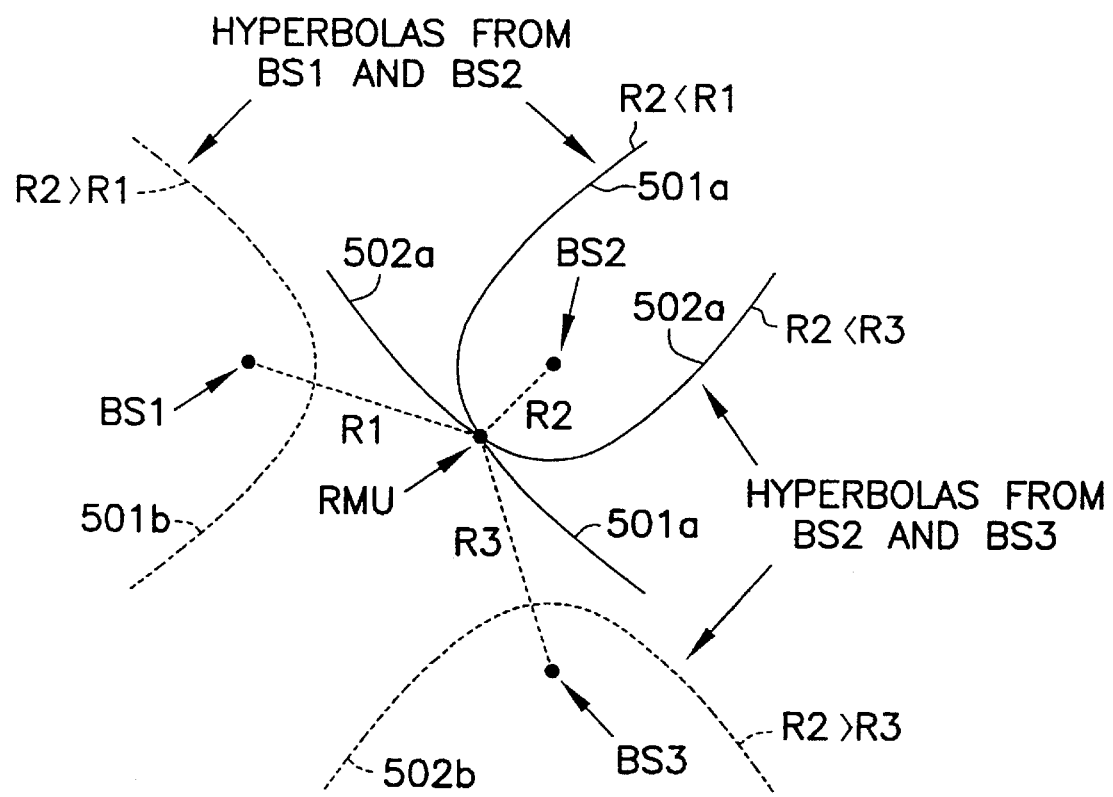
FIG. 5 is a hyperbolic plot of the differential ranging of the present location system.

In the second major step, the time of arrival information from each base station and the range information (calculated across the multiple hops using an Inverse Fourier Transform) are sent to a central station where a range differential between two base stations is plotted, as shown in FIG. 5. The range differential forms a hyperbolic plot, for example 501a and 501b, between base station $BS_1$ and base station $BS_2$. We know that the range $R_1$ is greater than the range $R_2$ so that the hyperbolic plot 501b in dashed lines in FIG. 5 can be ignored. A second hyperbolic plot 502a and 502b is formed between base station $BS_2$ and base station $BS_3$. The intersection point between the two hyperbolic plots is the location of the remote mobile unit RMU.

Comparison of Differential Ranging to GPS

The operation of the present differential ranging system is quite different from the GPS (Global Positioning Satellite) system. The GPS is a navigation system that provides location for the vehicle that carries it. In order to monitor the vehicles, the system requires a communication system for delivering the location to a central office. The navigation process of the GPS is virtually the inverse process of the dual frequency differential ranging system of the present invention. The theoretical accuracy of the present invention is only dependent on the bandwidth, signal to noise ratio and some ambiguities described below. Although commercial GPS systems are made inaccurate on purpose, a comparison can still be made.

There are several facts in favor of the present differential ranging system for the task of remote mobile unit location over GPS. The GPS system requires direct line of sight to the satellites, since it has a very sensitive receiver. Differential ranging is transmitting in the 900 MHz band and thus does not require line of sight: it could operate from within buildings. Differential ranging does not require any other device other than the low cost RMU on the vehicle which makes it significantly lower cost. The power consumption of the differential ranging system is significantly lower since it requires only a low power transceiver, thus it is operates on batteries for a long timer (over 1 month on commercial batteries). The differential ranging system operates using frequency hopping and is less susceptible to multipath and interference than the GPS which operates in direct sequence spread spectrum. From measurements performed on the present direction finding system, it is by far less susceptible to ground multipath than the GPS. The complex receivers of the present invention are only in the base stations. The complex receivers of the GPS are in every vehicle.

Frequency Hopping System Overview

In the preferred embodiment of the present invention, transmitters and base stations similar to those used in the present invention are described in the aforementioned copending U.S. patent application Ser. No. 08/158,441 entitled "LOW-POWER FREQUENCY-HOPPED SPREAD SPECTRUM REVERSE PAGING SYSTEM" filed Nov. 24, 1993. The infrastructure of this reverse paging system serves as the basis of the present invention and the reverse pagers of this system operate similarly in the present system using a single carrier frequency instead of the two carrier signals of the present invention. The present invention allows the accurate location of the reverse pagers even in noisy and multi-path environments such as those found in urban environments and irregular terrain environments.

The environment in which the present invention is operated is shown in FIG. 1. The present invention is designed to operate in a communications environment known as NexNet™ in which a plurality of base stations service a particular area using the NexNet™ communications system. Each remote mobile unit receives standard paging messages as a downlink and can provide talk back messages as an uplink channel using frequency hopping spread spectrum radio frequency communication. The paging transmitter of the base stations 113 typically transmits with 200 Watts of power to send messages using a standard paging format such as POCSAG or other industry standard formats. Each remote mobile unit contains a paging receiver with a sensitivity of −115 dBm, a frequency-hopping dual frequency transmitter with a transmit power of one Watt and double side band modulator. Each base station includes a receiving antenna for the frequency hopped carrier signals and special processors for determining the phase difference between the two carriers of the double side band modulation.

Figure 2:
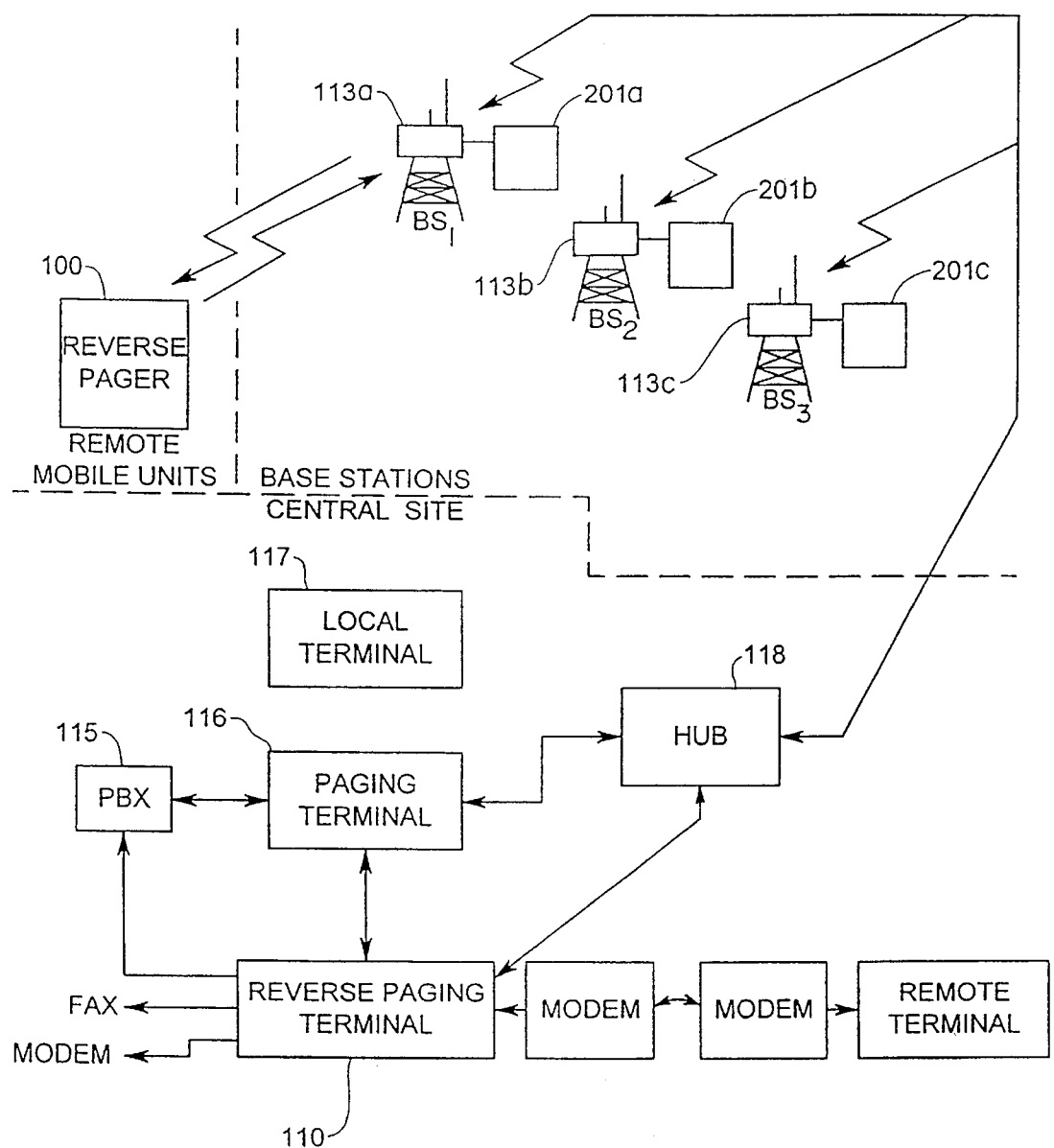
FIG. 2 is a block diagram of a reverse paging and mobile location system using the infrastructure of a standard paging system.

FIG. 2 depicts the major components of the two-way paging system in the aforementioned copending U.S. patent application Ser. No. 08/158,441 entitled "LOW-POWER FREQUENCY-HOPPED SPREAD SPECTRUM REVERSE PAGING SYSTEM" filed Nov. 24, 1993. The reverse paging terminal 110 at the central site operates to provide synchronization and messaging information through the paging terminal 116 to the reverse pagers 100 (also known as remote mobile units 100) via direct links to the base stations $BS_1$, $BS_2$ and $BS_3$ include transmit and receive towers 113a, 113b and 113c, respectively and base station terminals 201a, 201b and 201c, respectively. Terminals 201a–201c are required for producing the accurate synchronization information needed to be transmitted to the remote mobile units and for local processing of the received messages for transmitter location. This synchronization information is used to coordinate the frequency hopping transmissions and to coordinate the response of messaging from the plurality remote mobile units 100 so as to minimize collisions within groups of remote mobile units and eliminate collisions between groups of remote mobile units.

Base to Remote Synchronization

Figure 3:
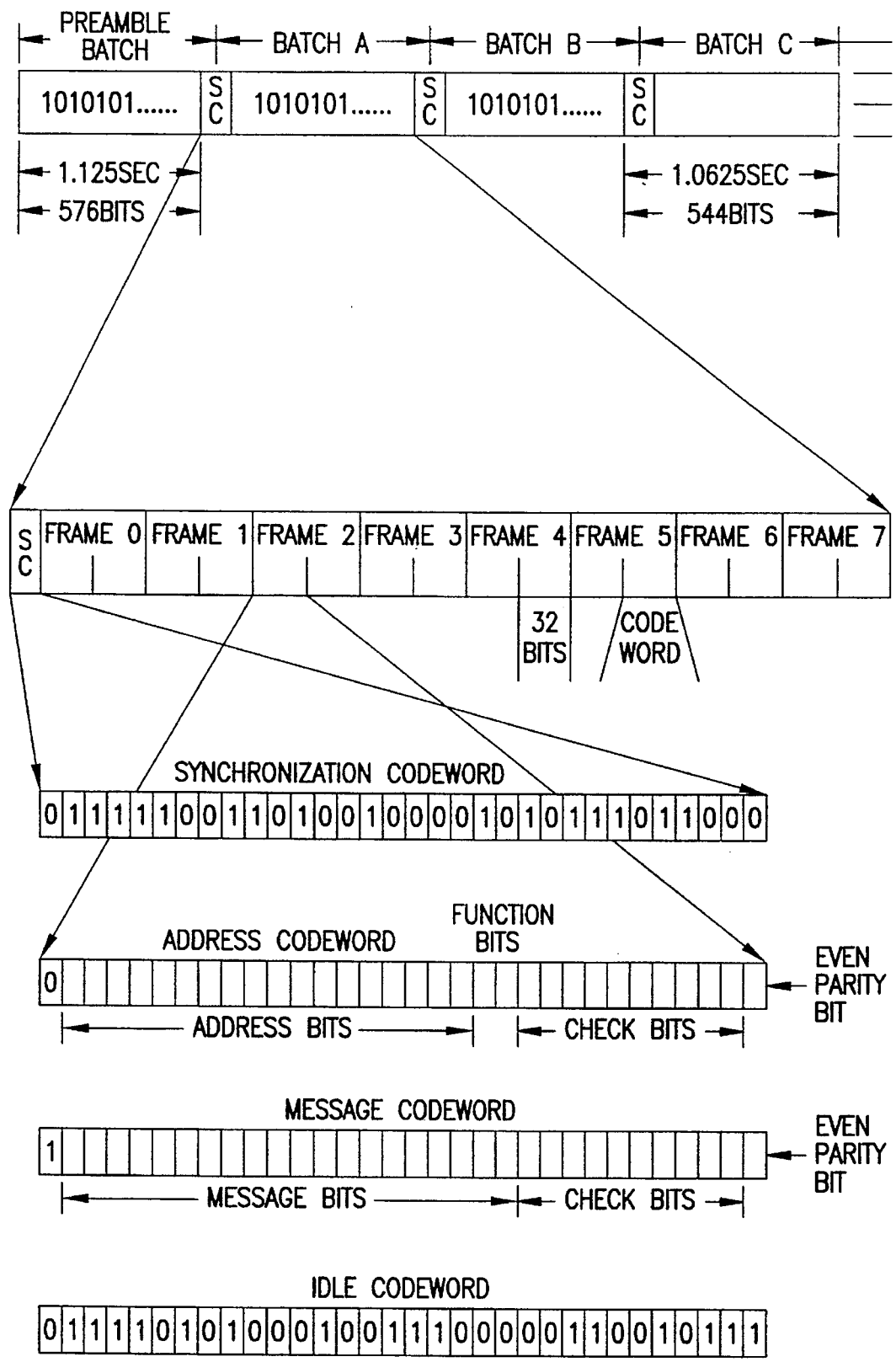
FIG. 3 describes the synchronization and message format of the outgoing paging signals from the base stations.
Figure 4:
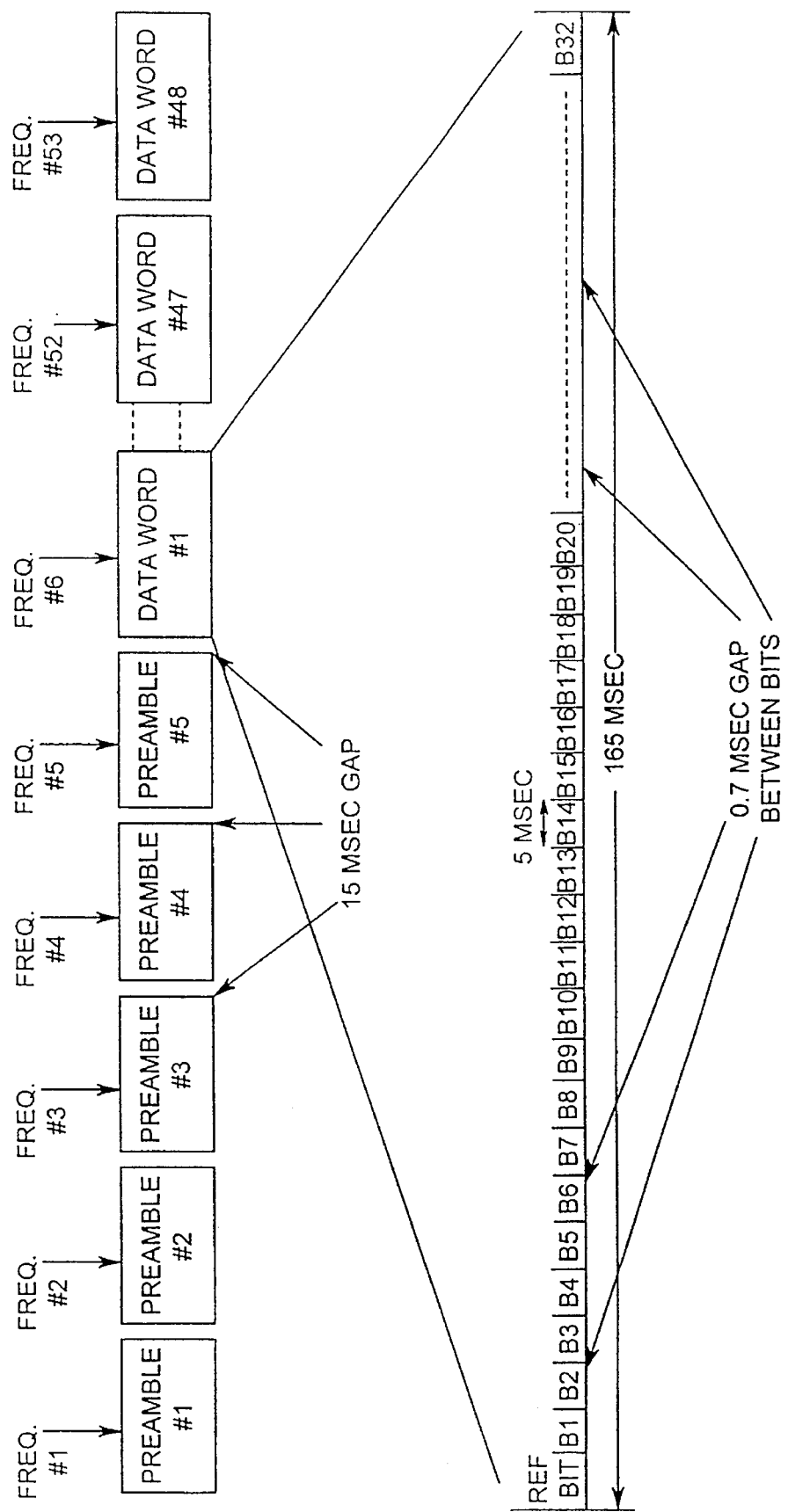
FIG. 4 describes the format of the frequency-hopped spread spectrum signal transmitted by the remote mobile units.

Standard paging messages sent from the base stations $BS_1$, $BS_2$ and $BS_3$ to the plurality of remote mobile units 100 are, in the preferred embodiment, sent as digital data encoded in the POCSAG paging standard. These messages may be used to interrogate the remote mobile units to activate the remote mobile unit to allow the base stations to begin the location process. Typically the paging channel has a center frequency of 143.160 MHz, with an NRZ FSK data rate of 512 bps or 1200 bps. Other bit rates such as 2400 baud (bps) are also feasible. FIG. 3 describes the POCSAG paging communications protocol as modified for use by the preferred embodiments of the present invention. In the top line of FIG. 3, a greatly compressed time line of digital data transmitted according to the POCSAG protocol is shown. Batches of messages are transmitted in groups as shown in the details in the subsequent lines below the top line of FIG. 3. In the second line of FIG. 3, a 1.0625 second interval (for 512 baud) is shown in which 544 bits are transmitted as a single batch. The batch is preceded by a synchronization code word SC as shown in the third line of FIG. 3.

The synchronization code word within each batch is followed by eight frames of digital data. Each frame is divided into two portions, an address portion and a message portion. The address code word of the message of frame 2 of FIG. 3 is shown in line 4 while the message code word of the second half of frame 2 is shown in line 5. The address code word is preceded by a digital zero followed by 18 address bits, two function bits and 10 check bits. The address code word is followed by an even parity bit. The message code word portion of the frame is preceded by a digital one followed by 20 message bits which are followed by 10 check bits and a single even parity bit. Thus each frame is comprised of 64 bits divided into two 32 bit sections.

Synchronization of the base station terminal 200 and the remote mobile units 100 is necessary to ensure the units 100 are transmitting at the same time that the base stations are listening. Synchronization is also necessary to coordinate the division of the large number of remote mobile units into groups so that member of one group use different frequency hopping patterns from members of other groups. Synchronization of the remote mobile units 100 is accomplished by inserting a special frame into the POCSAG data which is used to synchronize the units.

The purpose of synchronization between the reverse paging terminal 110 and the remote mobile units 100 is to determine where along the psuedo random noise code the frequency hops are to be followed and to determine the exact times for transmitting frequencies from within any of the hops. This also enables the dynamic changing of a remote mobile units group membership such that if one group is experiencing a large number of collisions due to simultaneous transmissions, the reverse paging terminal 110 may re-allocate some of the remote mobile units within that group to new groups to minimize collisions.

Referring once again to FIG. 3, eight frames of information are transmitted in each burst using the POCSAG format. Remote mobile units 100 may be assigned to a specific frame within the transmission so that the remote mobile units, once recognizing the synchronization code word, can scan a specific frame for that remote mobile unit's address. Once the address is found, the remote mobile unit can determine any group changes that may be required to re-allocate that remote mobile unit to a different group. In addition, the POCSAG format is used to transmit a fine time synchronization code. The fine synchronization code is a transmission of a time pulse at an exact time synchronized to a GPS (Global Positioning System (clock to synchronize all the remote mobile units 100 for time of transmission. For example, periodically during the day the reverse paging terminal will send a synchronization code within the POCSAG code word which is sent at a very precise time. In order to ensure that a precise time pulse is sent, the reverse paging terminal 110 receives accurate time information using a GPS antenna to receive accurate time of day information. The time used to send the synchronization pulse is when the day clock reaches exactly some multiple of 0.9 seconds in the preferred embodiment. In the synchronization information, 20 bits of information are transmitted to give the accurate time of day information.

In each of the remote mobile units 100, the microprocessor compares this accurate time pulse which will indicate the exact time of day and compare it to its own day clock. The clock within each microprocessor is accurate down to a few milliseconds, but the time at which the synchronization pulse occurs should have a resolution much finer than that such as down to 0.1 milliseconds for time of day. In this fashion, each of the microprocessors in each of the remote reverse paging devices can periodically realign its day clock to know within a millisecond the exact time. Each microprocessor does not actually realign its clock but changes a clock offset within memory so that it understands how far off its own internal clock is and can make the adjustment when using that clock to determine when to start transmitting information.

The synchronization pulse is only transmitted every few minutes. However, the resolution of the start of the message indicating the synchronization pulse is very accurate, it being transmitted at 0.090000 seconds GPS time after a fixed time of day, such as 12:00 GMT. This GPS time is accurate to at least within 100 nanoseconds.

An overview of the transmission format of the remote mobile unit is shown in FIG. 5. The actual transmission of information from the remote mobile units 100 is done using Differential Bi-Phase Shift Keying (DBPSK) modulation on a frequency hopped carrier of less than one watt. The transmission of information from the remote mobile units 100 on the frequency hopped carrier may also be done using Frequency Shift Keying (FSK) modulation. The same information is modulated on the two carriers in the preferred embodiment of the present invention allowing the base station to decode the information from either carrier or both carriers. The dual carriers are preferably two different narrow hop frequencies.

Typically a single transmission consists of 53 hops or 53 changed frequencies selected from a list of narrow band frequencies. The frequency selection is based on a pseudo-random noise code list pointing to the frequency selection list. The synchronization information tells the remote mobile unit 100 where along the pseudo random noise code it should be synchronized for transmission of its message and tells exactly the time of day so that the remote mobile unit 100 knows exactly when to start transmitting the specific frequency so that the base stations BS1, BS2 and BS3, labeled 113a, 113b and 113c, respectively, are looking for that frequency at the same time.

In operation, 200 frequencies are used by the remote mobile unit 100 and the base stations and internally stored in a list numbered F1 through F200. For a specific message, 53 frequencies will be used to transmit the entire message. These 53 frequencies are selected based on a 1,000 member pseudo-random noise code.

The use of the accurate synchronization signal periodically broadcast via the outbound paging signal enables the remote mobile units to use lower accuracy components thus reducing the manufacturing cost of remote mobile units. For example, high accuracy crystals to track the time of day within the microprocessor are available with an accuracy of three parts per million. Thus, a time drift of approximately three micro seconds per second or 180 microseconds in a minute is the known drift. There are also time inaccuracies which are introduced due to variable path length between the paging tower to the remote mobile unit. By employing crystals which are cheaper and have an accuracy of the order 50 parts per million, the amount of time-of-day normally would't be tolerable. However, by using the synchronization information transmitted on a regular basis from the reverse paging terminal, the microprocessor can continually correct its own internal day clock so that accurate time of day measurements are always maintained. The microprocessor estimates the momentary inaccuracy of the crystal by tracking the drift across several synchronization transmissions and dynamically adjusts for the frequency drift of the crystal and the offset using internal offset registers for accurate time of day information.

Counters are employed within each microprocessor of the reverse paging units to compensate for the offset of the frequency based on the synchronization time information. There are generally two major factors which affect the drift in a crystal: temperature and acceleration. Most of the drift is due to temperature, and the remaining drift components are negligible. The frequency drift in a crystal due to temperature is very slow, on the order of 50 Hz over 10 seconds. During a single day the temperature can change by 20 or 30 degrees fahrenheit, requiring a time update from the GPS clock approximately every five minutes.

Remote Mobile Unit Transmission Format

The signal sent from the remote mobile unit 100 to the base stations is a spread-spectrum, frequency-hopped transmission using differential bi-phase shift keying (DBPSK) modulation on the frequency-hopped carrier to transmit digital information. The transmission of information from the remote mobile units 100 on the frequency hopped carrier may also be done using Frequency Shift Keying (FSK) modulation. The frequency hops are relatively slow, the frequencies transmitted are very narrow and the transmission power is extremely small.

The maximum peak output power of transmission from remote mobile unit 100 is limited to less than one Watt to allow use of the 902–928 MHz ISM band in the United States without the need for licensing the remote mobile units as allowed by FCC regulations defined in 47 C.F.R. §15.247, which is hereby incorporated by reference. Those skilled in the art will readily recognize that other frequency bands and transmission power levels may be employed depending upon FCC licensing requirements or other licensing requirements of other nationalities.

The use of an accurate crystal to control each frequency of transmission is required within each remote mobile unit 100. For example, high accuracy crystals to transmit the narrow bandwidth frequencies used for the frequency hopped transmissions are available with an accuracy of three parts per million. At 900 MHz, a 3 ppm drift would place a single frequency somewhere within a 2.7 KHz band. To tolerate frequency drift due to aging and temperature, each individual frequency of the frequency hopped signal is allocated to a 7.5 KHz band or channel, even though the actual frequency is on the order of 200 Hz wide skirt within this 7.5 KHz allocated bandwidth. Those skilled in the art will readily recognize that by using alternate components, the frequency channels (individual frequency of the frequency hopped signals) of 7.5 KHz allocated bandwidth may be wider or more narrow depending upon the overall allocated bandwidth for the system. For example, 1 KHz or less bands may alternatively be allocated per channel.

Tests on this invention have shown that by processing the received signals at the base stations entirely in the digital domain using the combination of unique Fast Fourier Transform algorithms of the present invention to locate and retrieve the frequency hops and by using a combination of unique confidence algorithms with a plurality of error correction codes, the receiving base station is able to pull the response information from a very low power signal from a distance of up to 45 kilometers (28 miles) in a flat terrain. In a rather noisy urban environment, a range of 24 kilometers (15 miles) is the norm. The information within the signals is accurately decoded even in severe multipath and noise conditions.

As shown in Table 1, the remote mobile unit message format consists of a preamble and the message body spanning a total of 53 frequency hops. Those skilled in the art will readily recognize that longer messages may be transmitted using the preferred embodiment of the present invention, and the messages format described here is illustrative but not limiting. Much longer message hops to transfer more digital data is also implemented but not described here. Of course, those skilled in the art will readily recognize that shorter messages than those described below are equally possible for the preferred embodiments of the present invention. The message length and number of transmission hops are a matter of design choice.

The message preamble consists of a predefined code of ones and zeros to get the attention of the base unit receiver to pull the message out of the noise. The preamble consists of 165 bits transmitted across 5 hops, that is, transmitted using DBPSK (Differential Bi-Phase Shift Keying) or Frequency Shift Keying (FSK) on five different frequencies selected from the frequency list with the specific frequencies selected based on the PN (Pseudo-random Noise) Code list stored within the remote mobile unit. The sequence location within the PN code that the remote mobile unit will begin to follow is based on the synchronized time of day. Within a single hop (a single carrier frequency), the carrier phase is modulated 33 times to encode the predefined one-zero pattern of the preamble.

The message body follows the preamble and consists of three groups of data. Each group consists of 30 actual data bits so that the entire message is, in the preferred embodiment of the present invention, 90 total data bits (although other bit length messages may be chosen). The actual data encoded within these 90 bits is described above and may be in any convenient coded format. Those skilled in the art will readily recognize that a wide variety of message formats and encoding of the data bits may be used without departing from the spirit and scope of the present invention. The encoding described here, however, has been proven effective in retrieving the data bits buried in background noise with a high degree of accuracy and a low actual error rate.

Inner Coding and Interleaving

The inner coding of the message will protect the integrity of the message with an error rate as high as 25%. Each block of 64 bits of data (corresponding to a groups of 30 bits and earlier encoded by a standard 30,63 BCH code) is split into two sub-blocks of 32 bits (sub-blocks A and B of Table 2), and a reference bit is added to each sub-block to assist the differential encoding to provide a reference bit to the DBPSK or FSK decoder. The 33 bit sub-blocks are transmitted over one frequency hop each and are replicated 8 times so that the 64-bit block traverses 16 frequency hops. In transmission, the 33 bit sub-blocks are interleaved to further reduce loss of data, as shown in Table 3, where sub-blocks A and B of Table 2 correspond to the first group of 30 bits, sub-blocks C and D, correspond to the second group of 30 bits, etc. The total message is 53 hops where each hop is 180 msec in length making the duration of a single message 9.54 seconds.

TABLE 1

Remote Mobile Unit Message Format

Preamble is 165 bits (33 bits × 5 hops)
Message is 48*33 transmitted bits
(Message is 90 bits actual data)

☐ = One Frequency Hop

Outer Message Coding

Each of the three groups of message data (30 bits each) are BCH encoded using a standard 30,63 BCH code and with a single parity bit added to form a 64-bit word. This encoding decreases the error rate from $10^{-2}$ to $10^{-5}$. This encoding, documents and understood by those skilled in the art, can correct up to 6 errors or detect up to 13 errors. Detection of corruption of a data word that cannot be reconstructed will cause the base to request a second transmission of the acknowledgement message.

TABLE 2

Interleaving Format for Sub-block

A = 1 reference bit and 32 data bits = 33 bits
B = 1 reference bit and 32 data bits = 33 bits ☐ = One Frequency Hop

| A | B | A | B | A | B | A | B | A | B | A | B | A | B | A | B |

TABLE 3

Inner Coding and Interleaving of Sub-blocks

A = first 33 bits of 1st block
B = second 33 bits of 1st block
C = first 33 bits of 2nd block
D = second 33 bits of 2nd block
E = first 33 bits of 3rd block
F = second 33 bits of 3rd block ☐ = One Frequency Hop

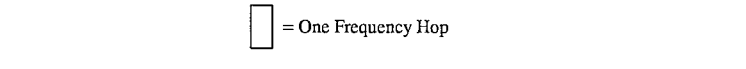

Those skilled in the art will readily recognize that a wide variety of data interleaving may be utilized to effect better error tolerance and may be substituted for the interleaving described here. Such alternate substitute interleaving means are CIRC (Cross Interleaved Reed Solomon Code) used in CD (Compact Disc) recording media operating either at the block level or at the bit level.

indicate a logical zero. The frequency shift is minor and the frequency differential is contained within a single hop channel.

Each bit of DBPSK or FSK is a transmission of 5 milliseconds of the hop carrier frequency either in phase with reference bit transmission or 180 degrees out of phase.

TABLE 4

Single Frequency Hop Format

Guard time (quiet) = 15 ms
Single Bit = 5 ms of carrier DBPSK / FSK
33 Bits plus guard time = 180 ms

| 15ms Guard Time | 5ms Ref Bit | 5ms 1st Bit | 5ms 2nd Bit | 5ms 3rd Bit | | 5ms 31st Bit | 5ms 32nd Bit |
|---|---|---|---|---|---|---|---|

Single Hop Format

The acknowledgment signals are transmitted by the remote mobile units 100 in a 1.5 MHz band selected from within the 902–928 MHz spectrum. The 1.5 Mhz band is divided into 7.5 KHz channels to provide 200 channels available in which the frequency hops can occur. Thus, each frequency hop is a channel 7.5 KHz wide in which a carrier frequency is transmitted. For example, channel one will have a frequency F1 at 902.00375 MHz+–3.75 KHz, channel two will have its center carrier frequency at 902.01025 MHz+–3.75 KHz, etc.

Each transmit frequency of each hop will thus be centered at the approximate mid-point of the assigned channel band; however, due to inaccuracies in the remote mobile unit circuits and reference crystals, the actual transmit frequencies will vary between units. If high quality crystals are used to accurately produce the required frequencies, very little drift off the center frequency will result. In the preferred embodiment of the present invention, low cost crystals are purposely employed to keep the per-unit manufacturing costs down. This will allow for a lower-cost product sold to the user which will increase market penetration. Thus, reference crystals are preferred which have a frequency accuracy of 3 ppm such that at 900 MHz, the statistical drift would be approximately 2700 Hz. The crystals center frequency within its nominal accuracy also drifts due to aging and temperature variations, but this drift is slow compared to the transmission times so that drift during a single transmission due to these latter variants is unimportant.

A single frequency hop is shown in Table 4. The 15 millisecond guard time preceding each hop is primarily a settling time for the oscillator circuits of the remote mobile units to allow the internal oscillator circuit to lock onto the new frequency between hops. Each hop is transmitted at a single frequency in which the phase of the carrier is either at 0 degrees phase or 180 degrees phase in reference to the phase of the reference bit immediately following the quiet or guard time. Thus the first bit is a phase reference bit followed by 32 data bits exhibiting either zero phase shift or 180 degree phase shift to encode the data bits as DBPSK (Differential Bi-Phase Shift Keying). In an alternative implementation, each frequency hop may be modulated using Frequency Shift Keying (FSK) in which two frequencies are used to transmit data bits. One hop frequency may indicate a logical one while a second hop frequency may Frequency Hopping Sequence All of the remote mobile units in the market serviced by the reverse paging terminal for message or location finding use the same pseudo random noise code to determine the frequency hops. The pseudo random noise code is a digital code of 1000 unique numbers. In the preferred embodiment of the present invention, the pseudo random noise code is stored in memory of each of the remote mobile units. Those skilled in the art will readily recognize, however, that a linear feedback shift register could be used to generate the pseudo random noise code on a real-time basis instead of using a look-up table which is presently in the preferred embodiment.

The PN (pseudo-random noise) code list is stored in memory and maps to a frequency list. In the preferred embodiment of the present invention, the PN code list has 1,000 entries which repeat as a sequence. The control means of the reverse paging units continuously maintain a count of the proper location within this list. As described below, the time of day for all remote mobile units in the market served by the base terminal are periodically synchronized to ensure acknowledgment messages are synchronized to transmit the hop frequency at the proper time and to synchronize the location within the PN code list that each remote mobile unit will use to transmit.

The 1,000 member PN code list maps to a 200 member frequency list. In order to allow a large number of remote mobile units to simultaneously operate in the same geographic market, the remote mobile units are divided into groups and the groups are assigned different sequence segment locations in the same 1,000 member PN list. Thus a remote mobile unit from group one will begin transmitting a hop at a frequency determined from a first location in the PN code, while a remote mobile unit from group two may begin transmitting a hop at a frequency determined from a second location in the PN code. The remote mobile units from group one and group two will complete their respective acknowledgement messages in 53 hops. Preferably, the sequence of the PN code used to determine the frequencies of the 53 hops for the remote mobile unit of the first group will not overlap the sequence of the PN code used to determine the frequencies of the 53 hops for the remote mobile unit of t he second group. More preferable, the frequencies chosen based on the non-overlapping segments of the PN code list are orthogonal such that the same frequency is never used by two remote mobile units belonging to different groups.

In the preferred implementation, the 1,000 member PN code list is divided into 160 hopping sequences. The remote paging units are divided into 40 groups with the members of each group synchronized to track the same location in the PN code list. The microcontroller of each remote mobile unit, regardless of its group membership, continuously runs through the repeating PN code sequence to stay in synchronization with the base unit and all other remote mobile units. Each group of remote mobile units is further divided into four subgroups such that the remote mobile units within each subgroup are assigned one sequence within the PN code list. Although the 53 hop sequence needed for each acknowledgement transmission may overlap the 53 hop sequence used by a remote mobile unit in another subgroup, the transmission sequences of a remote mobile unit of one group is chosen to not overlap the 53 hop sequence used by a remote mobile unit in another group.

Base Station Design

The analysis of the dual carriers and the decoding of the signals received by the base stations from the remote mobile units is done almost entirely in the digital domain. The carrier frequencies of the frequency hops are down-converted to a lower frequency in each base station and are then digitally sampled. The digital samples are then processed to locate the phase information of interest for direction finding and message decoding. Each base station is constructed with a plurality of digital signal processing based receivers which enable simultaneous message decoding and direction finding of a plurality of simultaneously transmitting remote mobile units. The dual carriers are analyzed in parallel to determine the exact phase separation. Each bases station is also equipped with a rubidium atomic clock for accurate time-of-day calculation. Those skilled in the art will readily recognize that other, less accurate clocks such as GPS clocks can be used but the effective location resolution may be affected.

Differential Time of Arrival System

Figure 6:
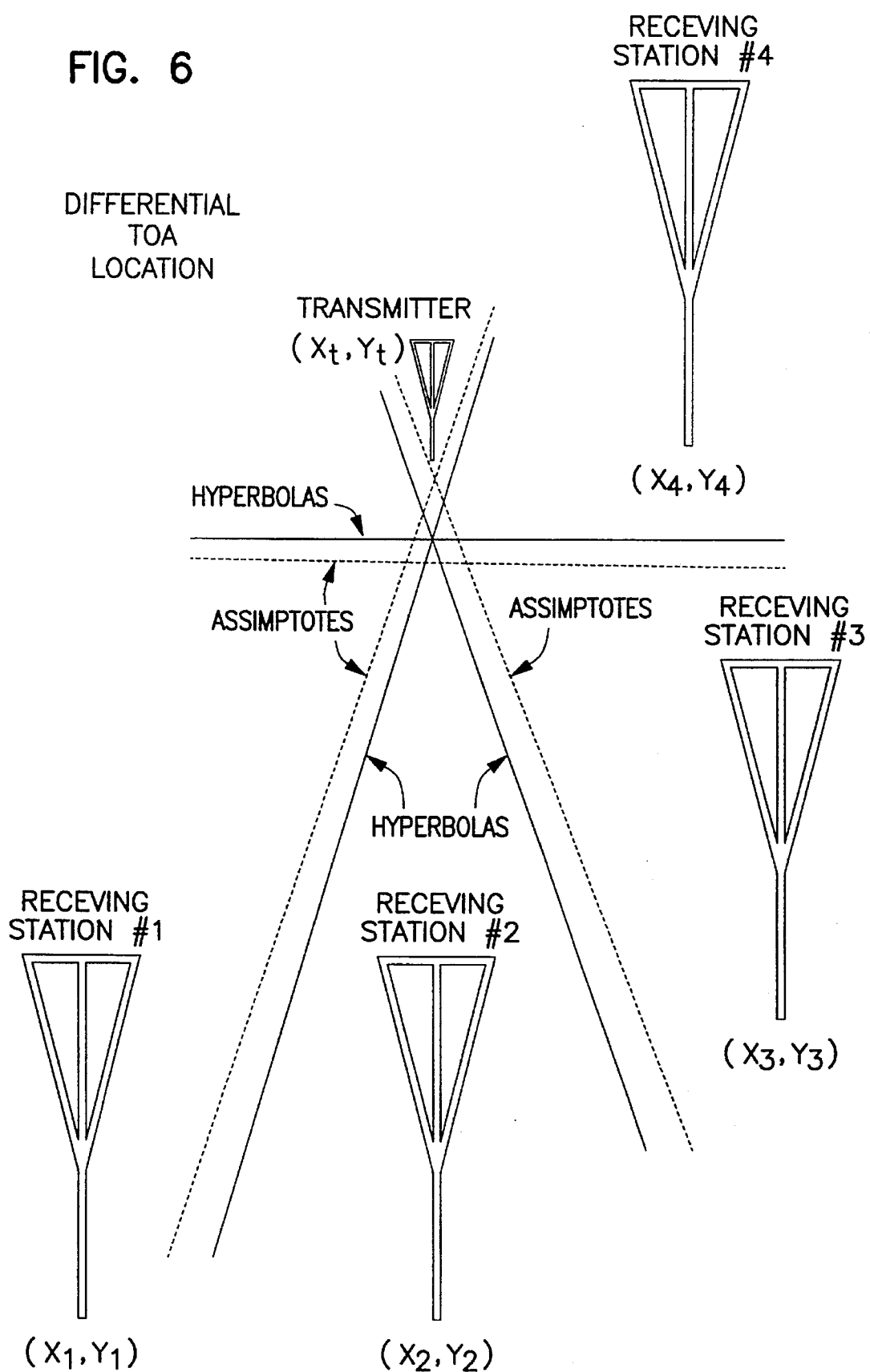
FIG. 6 is a diagram of the differential time-of-arrival aspects of the present location system.

FIG. 6 shows the basic principals of the Differential Time of Arrival (DTOA) System. The example system is configured by at least four receiving stations which operate at exactly the same clock. The transmitted signal is received by the receiving stations at $T_1$, $T_2$, $T_3$, and $T_4$ respectively. The base stations are located at $(X_1, Y_1)$, $(X_2, Y_2)$, $(X_3, Y_3)$ and $(X_4, Y_4)$. The four time measurements from the four base stations are resolved in non ambiguous fashion as follows:

$$C \equiv \text{Velocity of Light} \tag{1}$$

$X_t$, $Y_t$ are the coordinates of the transmitter, and are resolved directly from those 3 equations. $T_t$ is a dummy variable representing the time of transmission.

$$(X_1-X_t)^2+(Y_1-Y_t)^2=C^{2}*(T_1-T_t)^2 \tag{2}$$

$$(X_2-X_t)^2+(Y_2-Y_t)^2=C^{2}*(T_2-T_t)^2$$

$$(X_3-X_t)^2+(Y_3-Y_t)^2=C^{2}*(T_3-T_t)^2$$

$$(X_4-X_t)^2+(Y_4-Y_t)^2=C^{2}*(T_4-T_t)^2$$

The four equations are dependent (rank 3). Therefore three linear equations could be from them (by subtracting row 1 from row 2, row 2 from row 3 and row 3 from row 4):

$$(\text{Define: } \Delta P_{ij}=P_i-P_j; \text{ where } P=0 \text{ any parameter and } C\Delta T_{ij}=\Delta R_{ij}) \tag{3}$$

$$2\Delta X_{12}X_t+2\Delta Y_{12}Y_t-2C\Delta R_{12}T_t=X_1^2+Y_1^2-X_2^2-Y_2^2-C^2(T_1^2-T_2^2) \tag{3a}$$

$$2\Delta X_{23}X_t+2\Delta Y_{23}Y_t-2C\Delta R_{23}T_t=X_2^2+Y_2^2-X_3^2-Y_3^2-C^2(T_2^2-T_3^2) \tag{3b}$$

$$2\Delta X_{34}X_t+2\Delta Y_{34}Y_t-2C\Delta R_{34}T_t=X_3^2+Y_3^2-X_4^2-Y_4^2-C^2(T_3^2-T_4^2) \tag{3c}$$

Those three equations could be easily further reduced into two linear equations for $X_t$, $Y_t$ dependent only upon $\Delta R$ ij.

By dividing equation (3a) by $\Delta R_{12}$ and equation (3b) by $\Delta R_{23}$ and subtract the results and do the same for equations (3b) and (3c) we get the following equations.

$$(\text{Define: } D_{ij}^2=X_i^2=X_i^2+Y_i^2-X_j^2-Y_j^2) \tag{4}$$

$$X_t\{\Delta X_{12}/\Delta R_{12}-\Delta X_{23}/\Delta R_{23}\}+Y_t\{\Delta Y_{12}/\Delta R_{12}-\Delta Y_{23}/\Delta R_{23}\}=\{(D_{12}^2/\Delta R_{12})-(D_{23}^2/\Delta R_{23})-\Delta R_{13}\}/2$$

$$X_t\{\Delta X_{23}/\Delta R_{23}-\Delta X_{34}/\Delta R_{34}\}+Y_t\{\Delta Y_{23}/\Delta R_{23}-\Delta Y_{34}/\Delta R_{34}\}=\{(D_{23}^2/\Delta R_{23})-(D_{34}^2/\Delta R_{34})-\Delta R_{24}\}/2$$

The location could be resolved with only three bases, but it would result in an ambiguous solution which could be resolved by an a priori knowledge of the transmitter location.

Dual Frequency Differential Ranging Principle

Figure 8:
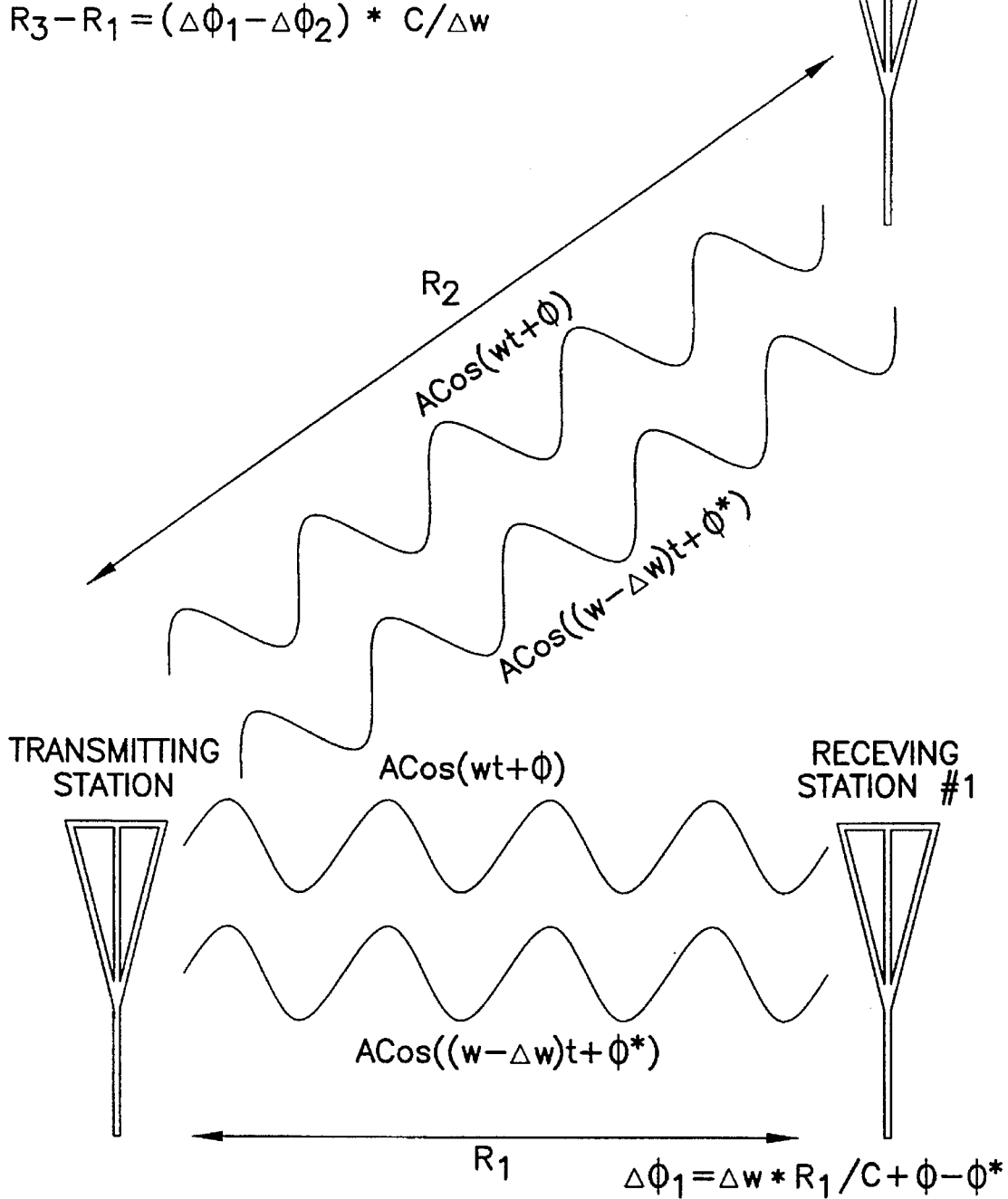
FIG. 8 describes in more detail the principle of transmitting two simultaneous frequencies to two receiving base stations.

The differential ranging system is based upon transmitting two simultaneous frequencies for each hop, with an alternating difference that solves the ambiguity. The principal is described in FIG. 8. The mathematical derivation of the differential ranging is based upon the phase difference that is created when two frequencies with a small difference in their wavelength are propagating over distance between the transmitter and the receiver. The two signals are represented as:

$$A_1(t)=A_0*Cos(wt+\Phi) \tag{5}$$

$$A_2(t)=A_0*Cos((w-\Delta w)t+\Phi_0) \tag{6}$$

The phase difference that is propagating through the distance $R_1$ between the transmitter and the first receiver is:

$$\Delta\Phi_1=wR_1/C+\Phi-(w-\Delta w)R_1/C-\Phi_0 \tag{7}$$

The same applies also for the second receiver which is at a distance of $R_2$ from the transmitter:

$$\Delta\Phi_2=wR_2/C+\Phi-(w-\Delta w)R_2/C-\Phi_0 \tag{8}$$

Solving the two equations:

$$\Delta R_{12}=R_1-R_2=(\Delta\phi_1-\Delta\phi_2)*C/\Delta w \tag{9}$$

$\Delta\Phi_1$ and $\Delta\Phi_2$ are measured by the digital receiver at each base station. $\Delta w$ is known a priori. The basic algorithm is as follows:

1. Compute the phase difference of the two frequencies at the first base station.
2. Compute the phase difference of the two frequencies at the second base station.
3. Compute the differential range using formula (9) above.

Ambiguity Resolution

There are two types of ambiguities in the differential ranging system. First, there is ambiguity that is created if the signal is received by only three stations. In that case the hyperbolas are intersecting in two points. Mathematically, that ambiguity cannot be resolved unless we have an a priori information (for instance—one of the points is in the sea), tracking data (the true intersection will move on roads) or other means such as Interferometer Direction Finding. The second ambiguity is the ambiguity in estimating $\Delta R$. The reason for the ambiguity occurrence in $\Delta R$ is apparent from formula (9) which should be expressed as:

$$\Delta R_{12} = R_1 - R_2 = (\Delta\Phi_1 - \Delta\Phi_2 + 2\pi n) * C/\Delta w \quad (10)$$

where n represents the fact that the difference in wavelength between the two frequencies could be larger than 1. Formulating it (10) at the first base station:

$$Define\ \Psi_{ij} = (0 - 2*\pi) \quad (11)$$

$$R_1 = (n_{11} + \Psi_{11}/2\pi)*\lambda = (n_{12} + \Psi_{12}/2\pi)*(\pi + \Delta\lambda)$$

$$t = R_1/C$$

$$A_{11}(t) = A_0 * Cos\ \{w(n_{11} + \Psi_{11}/2\pi)*\lambda/C + \Phi\}$$

$$w*\lambda/C = (w - \Delta w)*(\lambda + \Delta\lambda) = 2\pi$$

$$A_{11}(t) = A_0 * Cos\ \{2\pi n_{11} + \Psi_{11} + \Phi\}$$

$$A_{12}(t) = A_0 * Cos\ ((w - \Delta w)t + \Phi_0) = A_0 * Cos\ \{2\pi n_{12} + \Psi_{12} + \Phi_0\}$$

$$\Delta\Phi_1 = 2\pi(n_{11} - n_{12}) + \Psi_{11} - \Psi_{12} + \Phi - \Phi_0 = 2\pi(n_{11} - n_{12}) + \Delta\Psi_1 + \Phi - \Phi_0$$

For the second base station:

$$R_2 = (n_{21} + \Psi_{21}/2\pi)*\lambda = (n_{22} + \Psi_{22}/2\pi)*(\lambda + \Delta\lambda);\ t = R_2/C \quad (12)$$

$$A_{21}(t) = A_0 * Cos\ \{2\pi n_{21} + \Psi_{21} + \Phi\}$$

$$A_{22}(t) = A_0 * Cos\ ((w - \Delta w)t + \Phi_0) = A_0 * Cos\ \{2\pi n_{22} + \Psi_{22} + \Phi_0\}$$

$$\Delta\Phi_2 = 2\pi(n_{21} - n_{22}) + \Psi_{21} - \Psi_{22} + \Phi - \Phi_0 = 2\pi(n_{21} - n_{22}) + \Delta\Psi_2 + \Phi - \Phi_0$$

By subtracting the two measured phase difference we deduce:

$$\Delta\Phi_1 - \Delta\Phi_2 = 2\pi(n_{11} - n_{12} - n_{21} + n_{22}) + \Delta\Psi_1 - \Delta\Psi_2 = \Delta R_{12} * \Delta w/C \quad (13)$$

Figure 7:
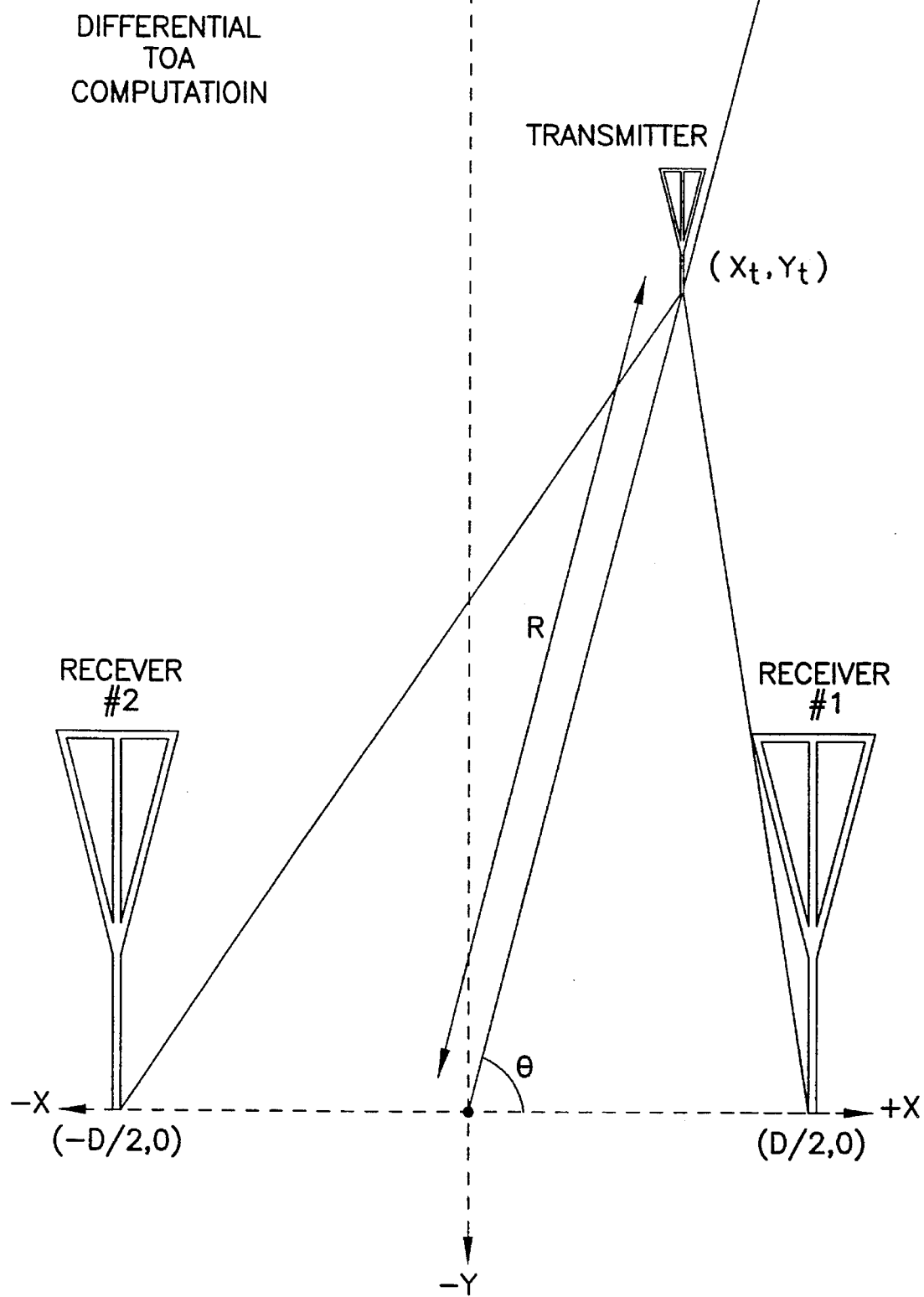
FIG. 7 shows the computations used to perform location using differential time-of-arrival ranging.

In order for $\Delta R_{12}$ to be non-ambiguous $n_{11} - n_{12} - n_{21} n_{22}$ has to be 0. $\Delta R_{12} < D$. In FIG. 7, the length of one side of a triangle is longer than the difference between the other two sides. Summarizing it:

$$Assume\ \Delta\Phi_1 - \Delta\Phi_2 < \pi \quad (14)$$

$$2\pi \Delta f * \Delta R_{12}/C < \pi$$

$$\Delta F < C/(2*\Delta R_{12})$$

$$\Delta f < C/(2*D)$$

For D practically limited by 50 Km, $\Delta f$ has to be smaller than 3 KHz. We chose to use resolution of 2.5 KHz. The problem is that the accuracy of $\Delta R_{12}$ is inversely dependent upon $\Delta w$—the larger $\Delta w$ is, the smaller the error in $\Delta R_{12}$.

Propagated Wave Form

The propagated wave form has to resolve two contradicting issues. It has a resolution of 2.5 KHz and it has a maximal difference in frequency in order to reduce ranging error. The proposed wave form suggests that the frequency difference $\Delta w$ will be an integer multiplication of the non ambiguous frequency $\delta w$:

$$\Delta w_i = i * \delta w\ \{1 \leq i \leq N\}.\ N \equiv Number\ of\ hops. \quad (15)$$

The phase difference is incrementing theoretically from hop to hop by $\delta\Phi$, not necessarily at the same order.

$$\delta\Phi \equiv \delta w * \Delta R/C \quad (16)$$

$$\Delta\Phi_i = \Delta w_i * \Delta R/C = i * \delta w * \Delta R/C = i * \delta\Phi$$

The evaluation of $\Delta R$ is done by computing $\delta\Phi$ which has no ambiguities. The proposed detection algorithm is as follows:

1. Create a complex vector of $V_i = \{V_0 Cos(\Delta\Phi_i), V_0 Sin(\Delta\Phi_i)\}$. Those values are the quadrate output of the $\Delta\Phi_i$ calculation and $\Delta\Phi_i$ does not have to be calculated explicitly.
2. Perform FFT ($V_k$).
3. Find the peak of the FFT and compute its exact "frequency." The "frequency" is a measure of the phase increments, and provides excellent estimation of $\delta\Phi$.

The algorithm automatically improves the signal to noise ratio by the factor of the number of hops. There is no dependency between the hop frequency and the frequency difference of the number of hops. The process is actually sampling in the frequency domain. The form of transformation from the frequency domain to the time domain is IFFT (Inverse Fast Fourier Transform) rather than FFT (Fast Fourier Transform). It has no effect on the results other than interpretation. The starting frequency does not have to be $\delta w$ or 0 but rather any frequency of our choice. It is equivalent to sampling in the time domain which does not start at $T_0 = 0$ which has no effect on the result of the FFT other than a phase shift.

Adaptation of Standard NexNet™ to Differential Ranging

The overall system throughput could be reduced due to two impacts. First, the power of each bit is reduced by at least 2, due to the face that the power is divided between 2 frequencies. In fact the power will be further reduced due to the non-linearity of the power amplifier which creates spurious frequencies that will consume part of the power. Second, the transmission of two frequencies requires a new frequency plan. The frequency resolution is reduced to 2.5 KHz (from 7.5 KHz) and a special care must be taken to align the hopping with the transmission of the two frequencies.

The creation of the two frequencies is done using a regular mixer which will multiply the local oscillator by a sine wave in $\Delta f/2$. The result will be:

$$Cos(2\pi f_{LO} t + \phi_{LO}) * Cos(2\pi\{\Delta f/2\} t + \phi_0 + \phi_{mod}) = \quad (17)$$

$$0.5 * Cos(2\pi\{f_{LO} + \Delta f/2\} t + \{\phi_{LO} + \phi_0\} + \phi_{mod}) +$$

$$0.5 * Cos(2\pi\{f_{LO} - \Delta f/2\} t + \{\phi_{LO} - \phi_0\} - \phi_{mod})$$

$$\phi_{mod} \equiv \pm \pi/2 (BPSK)$$

As is seen, the power is distributed between the two signals. The phase modulation is applied through the differential modulating frequency. Both frequencies are phase modulated in inverse which has no significant since the demodulation is differential. The frequency difference is $\Delta f$.

Design of the Remote Mobile Unit

Figure 9:
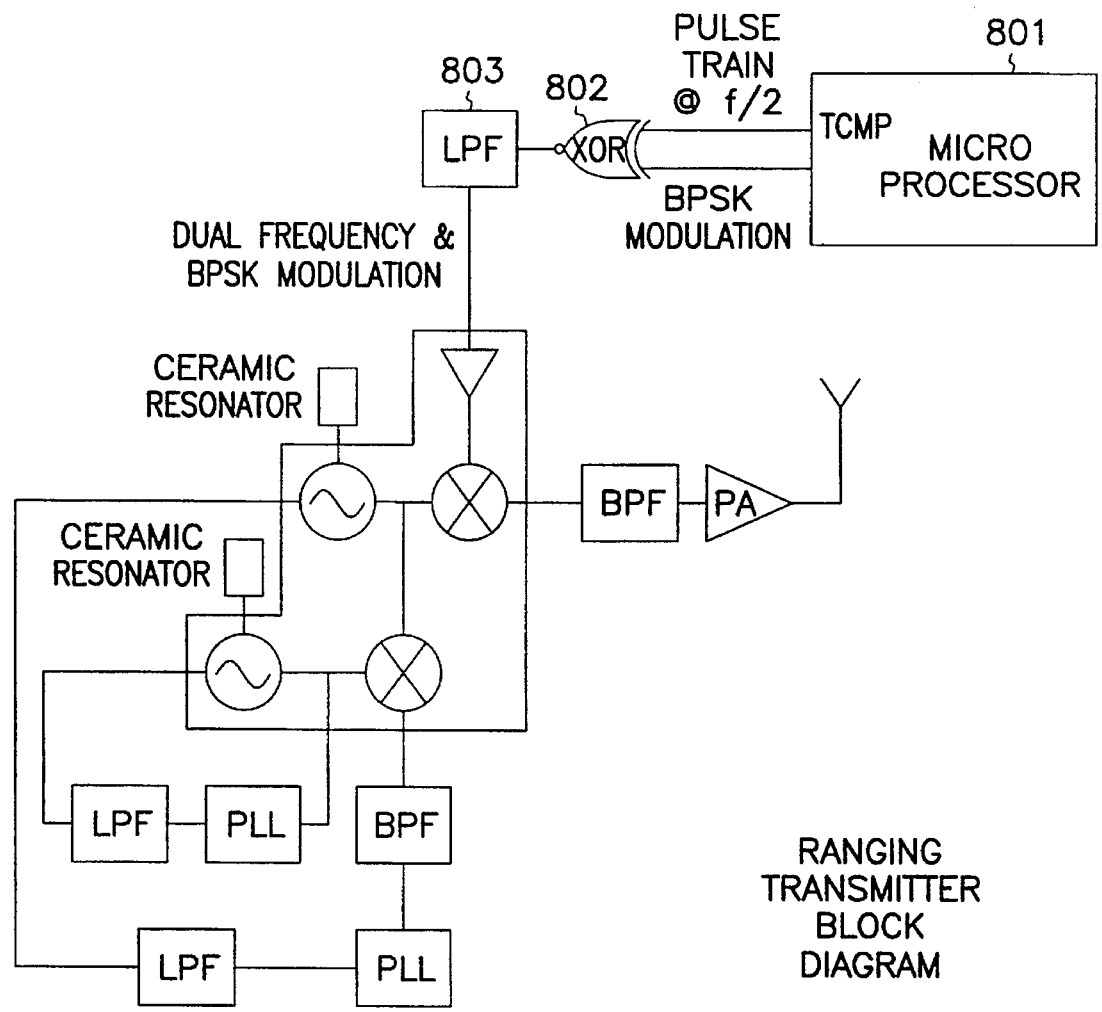
FIG. 9 is block diagram of the differential ranging transmitter.

In FIG. 9, the modulating frequency is generated by the microprocessor 801 from a port called "TCMP" (time compare) which is capable of generating a square wave pulse train. The pulse train is modulated by 0° or 180° using a digital XOR gate 802. The modulated square wave is passed through a low-pass (or band-pass) filter 803 which clips its harmonics and produces a sine wave which produces the two frequencies in the mixer. The ranging transmitter of FIG. 9 is designed to avoid carrier rejection and high order harmonics. The power amplifier performance is selected to be extremely linear. This results in avoidance of leakage of energy to other channels.

Figure 10:
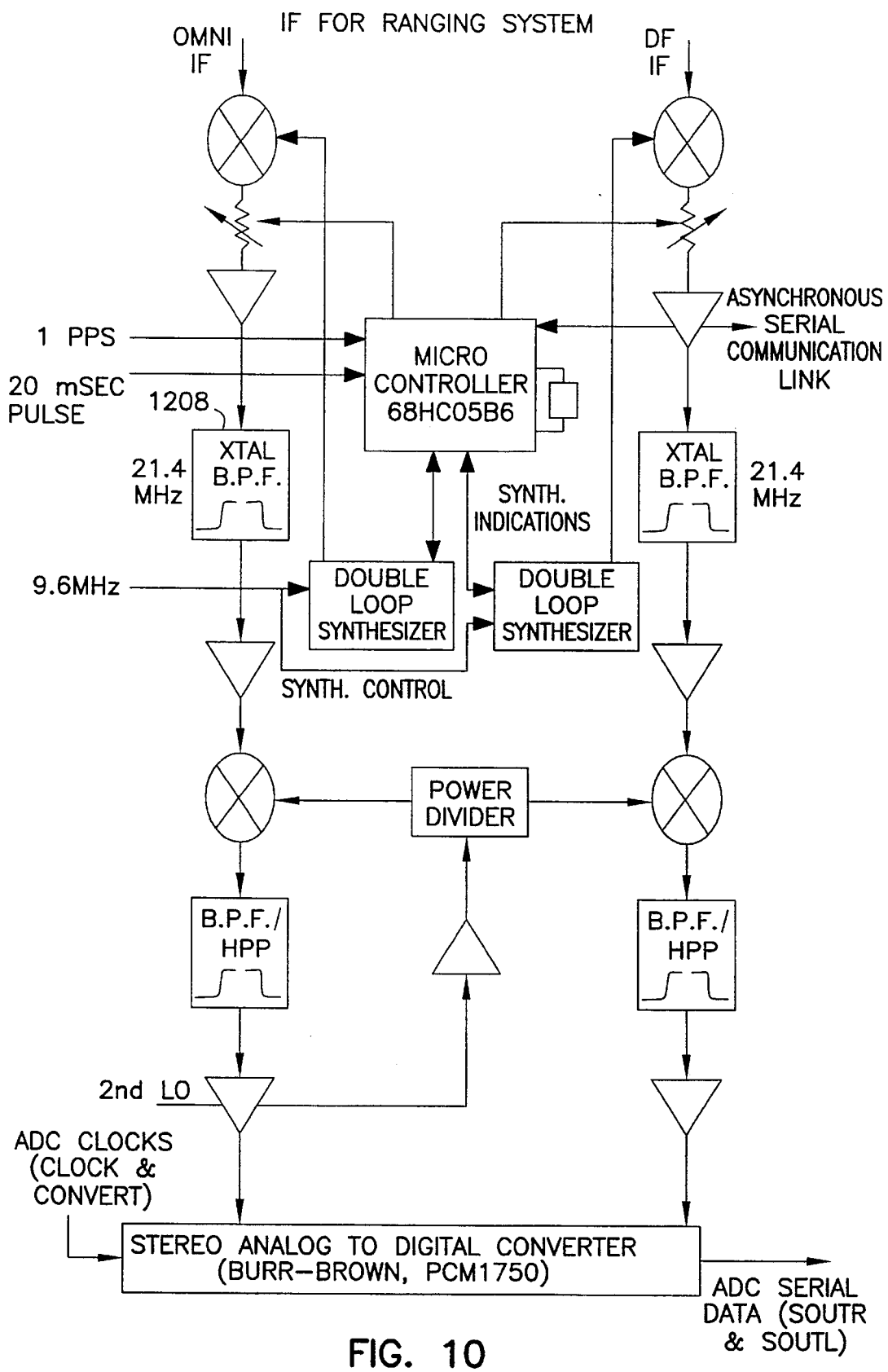
FIG. 10 is a diagram of the IF circuit of the differential ranging receiver in the base station which uses two separate convertors.

The IF circuit for the ranging system is shown in FIG. 10. The local oscillator downconverts the IF signals from 70±0.65 MHz to 21.4±0.018 MHz in 36 KHz channels. Two separate converters are used to operate in parallel. In order to ensure phase continuity between hops (the phase difference between the two frequencies must remain between hops) we must base the double loop synthesizer on DDS. (Direct Digital Synthesizer).

The process of finding the phase difference between the two frequencies is based on convolution of the two signals:

$$\Delta\Phi = arg(S_1 \otimes S_2^*) \quad (18)$$

where arg(.) is defined as the argument of the complex variable (.) The process is identical to the process of interferometer DF. The convolution is done on a complete hop (45 msec) after the data extraction and the necessary phase reversal. The phase data of each hop is transferred to the central station. The process of differential phase comparison is done in the central station. The location processing includes differential ranging computation as well as a combination of differential ranging and direction finding. In operation, differential ranging requires that periodic calibration be performed in real time. The accuracy of the system will be in the order of 300 nanoseconds, which mean that timing error in the range of 50 nanoseconds must be compensated. The most cost effective way to do it is to set up several transmitters in predefined places and to calibrate the timing offset accordingly. Assuming a short term drift of $10^{-10}$ (high performance oscillator), the time between calibrations will be:

$$T = 50 * 10^{-9}/10^{-10} = 500 \text{ seconds} \quad (19)$$

The present system supports remote activation of the calibration transmitters.

Accuracy of DTOA

The accuracy of the DTOA system is determined by comparing it to a regular triangulation direction measurement system. The geometric shape representing the points that have the property of the same difference time of arrival relative to a couple of bases is a hyperbola as shown in FIG. 7. According to trigonometric law of cosines:

$$\Delta R = R_2 - R_1 = \{R^2 + (D/2))^2 + R\ D\ Cos(\theta)\}^{1/2} - \{R^2 + (D/2)^2 - R\ D\ Cos(\theta)\}^{1/2}$$

$$(2R^2 + 2(D/2)^2 - \Delta R^2)^2 = 4[(R^2 + (D/2)^2)^2 - \{(R\ D\ Cos(\theta)\}^2] = 8R^2(D/2)^2 - 4R^2\Delta R^2 - 4(d/2)^2\Delta R^2 = 8R^2(D/2)^2 - 4\{(R\ D\ Cos(\theta)\}^2$$

$$Cos(\theta) = (\Delta R/D)(1 + D^2/4R^2)^{1/2} \text{ for } (\Delta R/R) << 1. \quad (20)$$

In order to simplify the evaluation of the inaccuracy of the location due to the inaccuracy of $\Delta R$ estimation, the inaccuracy of the asymptote is calculated. This is valid when D/2R<<1. Assuming D/2R<<1, the asymptote formula is:

$$Cos(\theta_A) = \Delta R/D \quad (21)$$

The asymptote has an ambiguity of ±θ due to its being an even function. Estimating the error in θ due to the error in ΔR is:

$$\sigma(\theta_A) = \sigma(\Delta R)/D * Sin(\theta_A) \quad (22)$$

For an example, let $E(\Delta R) = 50$ m, $D = 20$ Km, $E(\theta_A)$ is 0.14°. It could be shown that the hyperbola error is very close to the asymptote error. The error at the transmitter location could be evaluated as:

$$\sigma(R) = R\sigma(\theta) = \sigma(\Delta R)/\{(D/R)\ Sin(\theta)\} \quad (23)$$

Note that the error in the estimation of the DTOA is multiplied by a geometric factor $(1/(D/R)\ Sin(\theta))$. The constellation of the two receiving bases and the transmitter could be scaled up or down and the effect on the errors is the same. The term $(1/(D/R)\ Sin(\theta))$ is recognized as GDOP.

$$GDOP \equiv (D/R)\ Sin(\theta) \quad (24)$$

where GDOP=geometric delusion of properties.

Error Sources in Differential Ranging

External Thermal Noise is one source of error in the present invention. From equation (9) follows equation (25):

$$\sigma(\Delta R_{12}) = \sigma(\Delta\Phi_{12}) * C/\Delta w \quad (25)$$

Figure 11:
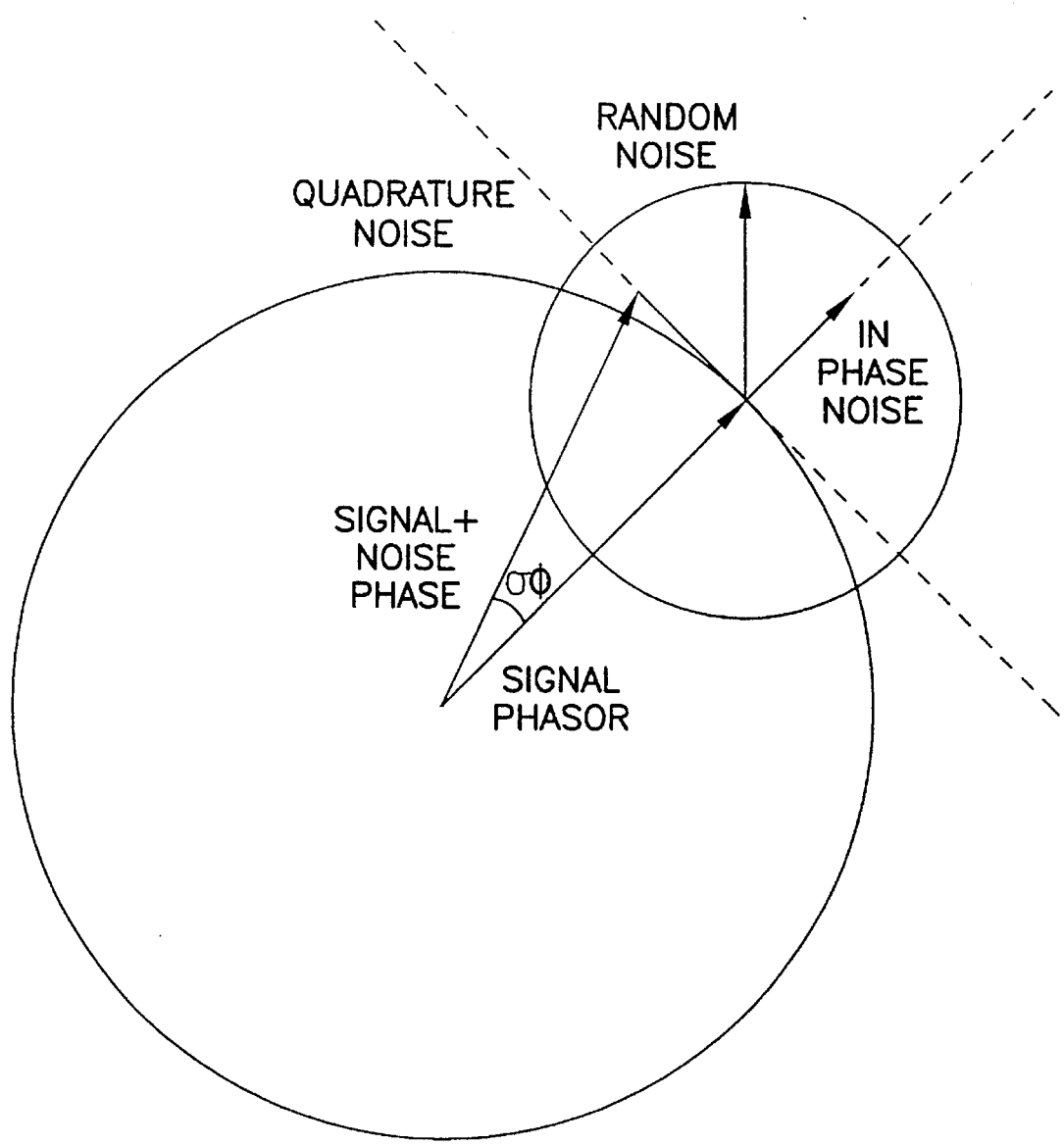
FIG. 11 is a phase plot showing the effect of sources of errors on the differential ranging technique.

For signal to noise ratio (SNR) above 10 dB the system uses the approximation (see FIG. 11):

$$\sigma(\Delta\Phi) = 1/(2\ SNR)^{1/2}; \ldots \sigma(\Delta\Phi_{12}) = 1/(SNR)^{1/2} \quad (26)$$

The error in $\Delta\Phi$ is dependent upon the algorithm. In order to simplify the process, in the alternative, the following is an algorithm for the extraction of the frequency out of the FFT. Find the peak of the FFT and its strongest neighbor. The value of these peaks are marked as P and $P^1$. The following is the amplitude distribution is a sine wave in FFT with boxcar window (signal power equals $A_0$ which is a function of the signal to noise ratio induced by $\Delta\Phi$).

$$A = A_0 * Sin(\pi - \delta\zeta) \quad (27)$$

$$N * \Delta\Phi = 2\pi k + \delta\zeta$$

Since $Sin(\delta\zeta) = Sin(\pi - \delta\zeta)$ the system deduces:

$$A'/A = \delta\zeta/(\pi - \delta\zeta) \quad (28)$$

$$\delta\zeta = \pi A'/(A + A')$$

In order to evaluate the accuracy of the estimation, a point is chosen which is the worst regarding the power distribution in the cells of the FFT. At this point A=A'. Assume that the noise is white i.e. $\sigma A = \sigma A' = \sqrt{n}$. The error in $\delta\zeta$ is:

$$\sigma(\delta\zeta) = \pi\{\sigma A(A^2 + A'^2)^{1/2}/(A + A')^2\} = \{\pi/2\sqrt{2}\} * \{\sigma A/A\} \quad (29)$$

$$A = A_0 * Sin\ (\pi/2) = A_0 * 2/\pi$$

$$SNR_o \equiv (A_0/\sigma A)^2$$

$$\sigma(\delta\zeta) = \{\pi/2\}^2/(2 * SNR_o)^{1/2}$$

Since the input noise is distributed over N cells of the FFT:

$$SNR_o = SNR_i * N \quad (30)$$

$SNR_i$ is the input signal to noise ratio. Finally:

$$\sigma(\Delta R_{12}) \approx \sigma(\Delta\Phi_{12})*C/\Delta w = (\pi/8)*C/(\delta f*N^{3/2} \{2*SNR_i\}^{1/2}) \quad (31)$$

where $C=300,000,000$ m/s
$N=53$
$\delta f=2500$ Hz,
$SNR_i=10$ dB=10 (integrating over a complete hop)
And the final result of the estimation of $\Delta R_{12}$ is:

$$\sigma(\Delta R_{12}) \approx 27 \ m \quad (32)$$

Multipath as a Source of Error

The effect of multipath is very different from the effect of the noise in two ways. First, the multipath is not necessarily independent, thus the averaging that is done through the FFT will not provide an improvement of $N^{3/2}$. Second, the signal to reflection ratio is rarely in the order of 10 dB. Several simulations were done in order to evaluate the effect of the multipath and the results showed that the frequency hopping scheme randomizes the effect of the multipath.

Doppler Shift as a Source of Error

The Doppler effect is only on the frequency difference. In 1 MHz difference we have:

$$\Delta f_{dmax} = V_{max}/\lambda = V_{max}\Delta f/C \quad (33)$$

Where:

$\Delta f_{dmax}$=Maximum Doppler shift $V_{max}$=Maximum radial velocity (assume 40 m/s)

$\Delta f$=Maximum frequency difference (up to 1 MHz)

Result in:

$$\Delta f_{dmax} = 0.13 \ Hz \quad (34)$$

Which is negligible since it causes a bias of 0.006 radians in each hop, which results in:

$$E\{\Delta R_{max}\}=E\{\Delta\Phi\}*C/\Delta w=E\{(\Delta\zeta/N)\}*C/\Delta w=13.6 \ m$$

E(p)—Error in parameter estimation

RMU Frequency Inaccuracy as a Internal Source of Error

The modulation of the dual frequency in the Remote Mobile Units (RMU) is done with a low cost oscillator which has a possible drift of 100 PPM. The error causes a direct error of 0.0001 in the differential ranging (see 32) which is an error of several meters in the worst case. Timing in another source of internal error. The most difficult bias error to overcome is the timing error between receivers. It is obvious that even an atomic reference clock with an accuracy of $10^{-12}$ results in 50 nanosecond error within 1.5 hours. The system design in based on calibration transmitters in predetermined places.

Internal Phase and Frequency Errors is another source of internal error. Differential frequency errors could be practically eliminated by using a TCXO (temperature compensated crystal oscillator) with 1 PPM accuracy. Phase errors could not easily be eliminated internally. But, if the frequency generators are phase continuous, the phase error creates a differential ranging bias error (see equation (T32) which has to calibrate continuously by the calibration transmitters. Note the possible group delay at the IF crystal filters.

Wave Form

The transmitted wave form is a dual frequency transmission with a difference of minimum of 200 KHz to 350 KHz, with resolution of 2.5 KHz.

The Two-Frequency Differential Range Algorithm

The following description is the complete mathematical analysis of the two frequency differential ranging algorithm taking into account all known sources of error. Let t denote the true time for the ith hop, where t=0 corresponds to the beginning of the ith hop. In the following equations, a dot above the variable indicates its derivative. The transmitter frequency at the beginning of the ith hop is given by $$f_{x,i}=f_{0,i}+\delta f_x+\dot{\delta f_x}(i-1)T, \quad (T1)$$

where $f_{0,i}$ is the basic frequency of the ith hop;

$\delta f_x$ is the transmitter frequency bias;

$\dot{\delta f_x}$ is the transmitter frequency drift;

T is the time interval between hops.

The two instantaneous phases of the transmitter frequencies are $$\Phi_{xa}=(f_{x,i}+f_{m,i})t+0.5\dot{\delta f_x}t^2+\Phi_{x,0}+\Phi_{m,0}+n_x(t) \quad (T2a)$$

$$\Phi_{xb}=(f_{x,i}-f_{m,i})t+0.5\dot{\delta f_x}t^2+\Phi_{x,0}-\Phi_{m,0}+n_x(t) \quad (T2b)$$

where $f_{m,i}$ is the frequency of the DSB modulation at the ith hop;

$\Phi_{x,0}$ is the initial carrier phase at the ith hop;

$\Phi_{m,0}$ is the initial phase of the DSB modulation at the ith hop;

$n_x(t)$ is the phase noise of the transmitter oscillator.

The instantaneous ranges at the ith hop are $$\begin{aligned} r_k(t) &= r_{k,0}+v_{k,0}[t+(i-1)T]+0.5a_{k,0}[t+(i-1)T]^2 \\ &= [r_{k,0}+v_{k,0}(i-1)T+0.5a_{k,0}(i-1)^2T^2] + \\ &\quad [v_{k,0}+a_{k,0}(i-1)T]t+0.5a_{k,0}t^2 \\ &= r_{k,i}+v_{k,i}t+0.5a_{k,0}t^2, \end{aligned} \quad (T3)$$

where k=1,2 is the receiver number;

$r_{k,0}$ is the range between the transmitter and the kth receiver at the beginning of the first hop;

$v_{k,0}$ is the velocity along LOS between the transmitter and the kth receiver at the beginning of the first hop;

$a_{k,0}$ is the acceleration along LOS between the transmitter and the kth receiver at the beginning of the first hop;

$r_{k,i}$ is the range between the transmitter and the kth receiver at the beginning of the ith hop;

$v_{k,i}$ is the velocity along LOS between the transmitter and the kth receiver at the beginning of the ith hop.

The two received signals at the kth receiver are $$y_{ka}(t)=2^{-\frac{1}{2}}exp\{j2\pi\Phi_{xa}(t-k_0r_k(t))\}m_{ka}(t)+w_{ka}(t) \quad (T4a)$$

$$y_{kb}(t)=2^{-\frac{1}{2}}exp\{j2\pi\Phi_{xb}(t-k_0r_k(t))\}m_{kb}(t)+w_{kb}(t), \quad (T4b)$$

where $\kappa_o$ is the inverse of the speed of light;

$m_{ka}(t)$ and $m_{kb}(t)$ are the multipaths of the two frequencies;

$w_{ka}(t)$ and $w_{kb}(t)$ are additive white noises for the two frequencies.

In practice, the two frequencies are not received separately, but their sum $y_{ka}(t)+y_{kb}(t)$ is received. However, since the two frequencies are separated by 7.5 KHz at least, which is much above the bandwidth of each frequency, we assume that they can be separated by prefiltering. This also explains the factor $2^{-\frac{1}{2}}$, namely, to reflect the fact that the total transmitter power is divided between the two frequencies.

The kth receiver generates two reference signals whose instantaneous phases are $$\Phi_{rka}(t)=(f_{0,i}+f_{m,i})(t-\theta+\delta t_{rk})+\Phi_{rk,0} \tag{T5a}$$

$$\Phi_{rkb}(t)=(f_{0,i}-f_{m,i})(t-\theta+\delta t_{rk})+\Phi_{rk,0}, \tag{T5b}$$

where $\theta$ is the delay, with respect to the beginning of the ith hop, at which demodulation starts;

$\delta t_{r,k}$ is the time bias of the kth receiver.

$\Phi_{rk,0}$ is the initial phase of the reference signal of kth receiver at the ith hop.

Note that the receivers are assumed to have "ideal" frequencies (zero frequency deviations), because the reference signals are synthesized digitally, so $f_{0,i}$ and $f_{m,i}$ are just numbers in the computer.

The demodulated signals at the receivers are $$d_{ka}(t)=exp\{j2\pi\Phi_{xra}(t)\} y_{ka}(t) \tag{T6a}$$

$$d_{kb}(t)=exp\{j2\pi\Phi_{xrb}(t)\} y_{kb}(t) \tag{T6b}$$

The equations derived so far are used in the simulation. In order to derive the estimation let us now ignore the noise. Also express the multipath in terms of its magnitude and phase, that is, $$m_{ka}(t)=A_{ka}(t)exp\{j2\pi\Psi_{ka}(t)\} \tag{T7a}$$

$$m_{kb}(t)=A_{kb}(t)exp\{j2\pi\Psi_{kb}(t)\}. \tag{T7b}$$

Then, $$d_{ka}(t)=2^{-\frac{1}{2}}A_{ka}(t) \exp\{j2\pi[\Phi_{rka}(t)-\Phi_{xa}(t-\kappa_0 r_k(t))-\Psi_{ka}(t)]\} \tag{T8a}$$

$$d_{kb}(t)=2^{-\frac{1}{2}}A_{kb}(t) \exp\{j2\pi[\Phi_{rkb}(t)-\Phi_{xb}(t-\kappa_0 r_k(t))-\Psi_{kb}(t)]\}. \tag{T8b}$$

The instantaneous phase of each demodulated signal contains a quadratic term, a linear term, a constant term, and a random term. Denote the coefficients of the linear terms by $f_{dka}$ and $f_{dkb}$ respectively. It is easy to verify that the linear terms are approximately given by $$f_{dka} \approx \kappa_0 v_{k,i}(f_{x,i}+f_{m,i})-\delta f_x-\delta f_x(i-1)T \tag{T9a}$$

$$f_{dkb} \approx \kappa_0 \mu_{k,i}(f_{x,i}-f_{m,i})-\delta f_x-\delta f_x(i-1)T. \tag{T9}$$

Suppose we estimate the linear terms (using a Discrete Fourier Transform with interpolation), and use the estimates to form $$\alpha_i = \hat{f}_{d1a}+\hat{f}_{d1b}-\hat{f}_{d2a}-\hat{f}_{d2d} \approx \kappa_0 f_{x,i}(v_{1,i}-v_{2,i}) \approx \kappa_0 f_{0,i}(v_{1,i}-v_{2,i}). \tag{T10}$$

The use of $\alpha_i$ is explained below.

Next let us form the signal $$\xi_k(t)=d_{ka}(t)d^*_{kb}(t)=0.5A_{ka}(t)A_{kb}(t)exp\{j2\pi[\Phi_{xb}(t-\kappa_0 r_k(t))-\Phi_{xa}(t-\kappa_0 r_k(t))+\Phi_{rka}(t)-\Phi_{rkb}(t)+\Psi_{kb}(t)-\Psi_{ka}(t)]\}. \tag{T11}$$

We have $$\phi_{xb}(t-\kappa_0 r_k(t))-\phi_{xa}(t-\kappa_0 r_k(t))=-2f_{m,i}(t-\kappa_0 r_k(t))-2\phi_{m,i}= \tag{T12}$$

$$2f_{m,i}\kappa_0 r_{k,i}-2f_{m,i}(1-\kappa_0 v_{k,i})t+f_{m,i}\kappa_0 a_{k,0}t^2-2\phi_{m,i}$$

$$\phi_{rka}(t)-\phi_{rkb}(t)=2f_{m,i}t-2f_{m,i}\theta+2f_{m,i}\delta t_{rk}. \tag{T13}$$

So, $$\xi_k(t)=0.5A_{ka}(t)A_{kb}(t)exp\{j2\pi[2f_{m,i}\kappa_0 r_{k,i}+2f_{m,i}\kappa_0 v_{k,i}t+f_{m,i}\kappa_0 a_{k,0}t^2-2\phi_{m,i}\theta+2f_{m,i}\delta t_{rk}+\Psi_{kb}(t)-\Psi_{ka}(t)]\}. \tag{T14}$$

The maximum value of $2f_{m,i}\kappa_0 v_{k,i}t$ is about $3\cdot 10^{-3}$, and the maximum value of $f_{m,i}\kappa_0 a_{k,0}t^2$ is about $2\cdot 10^{-5}$, so these two terms can be neglected, leaving $$\xi_k(t) \approx 0.5A_{dka}(t)A_{kb}(t)exp\{j2\pi[2f_{m,i}\kappa_0 r_{k,i}-2\Phi_{m,i}-2f_{m,i}\theta+2f_{m,i}\delta t_{rk}+\Psi_{kb}(t)-\Psi_{ka}(t)]\}. \tag{T15}$$

Assuming that $m_{ka}(t)$ and $m_{kb}(t)$ are strongly correlated, we have $\Psi_{ka} \approx \Psi_{kb}$. Let $\{t_n, 0 \leq n \leq N-1\}$ be the sampling instants of the ith hop and form $$\beta_{i,k}=(2\pi)^{-1}\cdot \text{angle}\left\{\sum_{n=0}^{N-1}\xi_k(t_n)\right\} \approx \tag{T16}$$

$$2f_{m,i}\kappa_0 r_{k,i}-2\phi_{m,i}-2f_{m,i}\theta+2f_{m,i}\delta t_{rk}$$

and $$\beta_i=\beta_{i,1}-\beta_{i,2} \approx 2f_{m,i}\kappa_0(r_{1,i}-r_{2,i})+2f_{m,i}(\delta t_{r1}-\delta t_{r2}). \tag{T17}$$

The bandwidth of the signals $d_{ka}(t)$ and $d_{kb}(t)$ is limited to about 200 Hz (twice the maximum Doppler frequency). Therefore they should be low-pass filtered to this value and decimated to a sampling frequency of about 200 Hz. With the present value of T (50 milliseconds), we get 10 samples per hop. If the bit rate is also 10 per second, the range estimation algorithm can be conveniently combined with the bit-detection algorithm, since the phase of each bit is needed for both purposes. The simulation does not include the filtering, but the standard deviation of the additive noise is computed in agreement with the assumed bandwidth.

Finally use the estimates $\alpha_i$ from equation T10 to compute $$\gamma_i = \beta_i - 2f_{m,i}T\sum_{l=0}^{i-1}\frac{\alpha_l}{f_{0,l}} \tag{T18}$$

$$\approx 2f_{m,i}\kappa_0(r_{1,i}-r_{2,i})-2f_{m,i}\kappa_0 \sum_{l=0}^{i-1}(v_{1,l}-v_{2,l})T+2f_{m,i}(\delta t_{r1}-\delta t_{r2})$$

$$\approx 2f_{m,i}\kappa_0(r_{1,0}-r_{2,0})-2f_{m,i}(\delta t_{r1}-\delta t_{r2}).$$

As we see, the role of $\alpha_i$ is to compensate for the motion during the hops and to estimate the initial range difference. Motion compensation depends on the receivers carrier frequencies being identical. If they cannot be made identical, this compensation will not be performed, and $\beta_i$ will be used for subsequent processing instead of $\gamma_i$.

The final stage of the algorithm is the estimation of the range difference from $\{\gamma_i, 0 \leq i \leq I-1\}$, (or from $\{\beta_i, 0 \leq i \leq I-1\}$, as discussed below). Let l(i) be the ordering of the hops such that $f_{m,l}(i)=f_{min}+lf_{m,0}, 0 \leq l \leq I-1$. Let $\eta_l=exp\{j2\pi\gamma_{l(i)}\}$. Then, except for the receiver synchronization errors $\delta t_{rk}$, $\eta_l$ is given by $$\eta_l=exp\{j4\pi\kappa_0(r_{1,0}-r_{2,0})(f_{min}+lf_{m,0})\}. \tag{T19}$$

Therefore, $2f_{m,0}\kappa_0(r_{1,0}-r_{2,0})$ can be estimated by performing a Discrete Fourier Transform with interpolation on the sequence $\{\eta_l, 0 \leq l \leq I-1\}$.

If we use $\beta_i$ instead of $\gamma_i$, the sequence of $\eta_l$ will not be a pure sinusoid (even in the ideal case), due to the transmitter motion. However, if $l(i)$ is sufficiently random, the phase deviation seen by (using a Discrete Fourier Transform with interpolation will be random, so this should not have much effect on the estimate. For example, if the speed is 30 m/s, the transmitter motion during the entire sequence of hops is no more than 120 m. With $f_{min}+f_{m,0}(I-1)=60$ KHz, this translates to about $0.05 \cdot 2\pi$ radians phase error. It is therefore expected that the Discrete Fourier Transform with interpolation procedure will give a good estimate of the average range, or the range at the $(I/2)$th hop.

The Multipath Model

Multipath is basically a linear phenomenon, that is, the received signal is a superposition of several signals, corresponding to several propagation paths from the transmitter to the receiver. One of these is the direct path, whose impulse response is assumed to be an impulse, with a gain factor $\alpha$ and a zero delay (the nominal propagation delay to the receiver is immaterial, and can be ignored). All the rest are reflected paths. Each reflected path is characterized by a random gain and a random delay. These random parameters vary over time in general, so that total response at time $t$ to an impulse transmitted at time $t_0$ is given by $$h(t, t_0) = a\delta(t - t_0) + \sum_n \alpha_n(t_0)\delta(t - t_0 - \tau_n(t_0)). \quad (T20)$$

The case $a=0$ is called Rayleigh fading, while the case $a>0$ is called Rice fading. In the Rayleigh case there is no direct propagation, only reflections. This happens when there is no line of sight between the transmitter and the receiver, and the wavelength is too short for diffraction to have an effect.

When the transmitted signal is $s(t)$, the received signal is given by the convolution of $s(t)$ with $h(t, t_0)$, that is, $$r(t) = as(t) + \sum_n \alpha_n(t)s(t - \tau_n(t)). \quad (T21)$$

If we now assume the existence of infinitely many reflected paths, each having an infinitesimal contribution, (T21) becomes $$r(t) = as(t) + \int_0^\infty \alpha(\tau, t)s(t-\tau)d\tau, \quad (T22)$$

where $\alpha(\tau,t)$ is the infinitesimal contribution at time $t$ of the reflection delayed by $\tau$. The statistical properties of $\alpha(\tau,t)$ will be discussed later.

Now let $s(t)$ be a CW signal, namely, $s(t)=\exp(\{j2\pi f_0 t\})$. Then $$r(t) = as(t) + \int_0^\infty \alpha(\tau, t)\exp\{j2\pi f_0(t-\tau)\}d\tau = \exp\{j2\pi f_0 t\}[a+m(t)], \quad (T23)$$

where $$m(t) = \int_0^\infty \alpha(\tau, t)\exp\{-j2\pi f_0\tau\}d\tau. \quad (T24)$$

As we see from (T24), the effect of multipath on a CW signal is multiplicative, and it depends on the function of $\alpha(\tau,t)$. Here we are interested in short-term multipath in urban areas and mobile transmitters (or receivers). A common model for $\alpha(\tau,t)$ in such scenarios is as a Gaussian process, stationary and narrowband in $t$, and nonstationary but uncorrelated in $\tau$. Thus we assume $$E\alpha(\tau,t)=0,$$

$$\Gamma(\tau_1, \tau_2; t_1, t_2)=E\alpha(\tau_1,t_1)\alpha(\tau_2,t_2)=\Gamma_t(t_1-t_2)\Gamma_\tau(\tau_1)\delta(\tau_1-\tau_2). \quad (T25)$$

The temporal correlation $\Gamma_t(t_1-t_2)$ depends mainly on the physical motion of the transmitter. In particular, if the doppler frequency of the transmitter is $f_{doppler}$ (corresponding to the wavelength and the transmitter speed), then the spectral density of $\Gamma_t(t_1-t_2)$ is limited to $\pm f_{doppler}$. The shape of the spectral density is difficult to estimate, since it depends on the given scenario, mainly on the spatial distribution of the reflections. In the simulation we used a flat spectrum in the range $\pm f_{doppler}$ for simplicity and "universality."

The function $\Gamma_\tau(\tau_1)$ describes the relative multipath power at different delays. It is also scenario-dependent and difficult to estimate. However, based on the graphs known in the art, we assume a functional dependence of the form $$\Gamma_\tau(\tau_1)=\exp\{-\tau_1/\tau_{mp}\}, \quad (T26)$$

where $\tau_{mp}$ is a scenario-dependent parameter. Note that when $\Gamma_\tau(\tau_1)$ is plotted in dB, it shows a decreasing straight line.

It is interesting to compute the multipath correlation for both different times and different frequencies. Let $m(t_1, f_1)$ be the multipath at frequency $f_1$ and time $t_1$, and similarly for $m(t_2, f_2)$. Then $$\Gamma_m(t_1, t_2; f_1, f_2) = Em(t_1, f_1)m^*(t_2, f_2) \quad (T27)$$

$$= E\int_0^\infty\int_0^\infty \alpha(\tau_1, t_1)\alpha(\tau_2, t_2)\exp\{-j2\pi(f_1\tau_1 - f_2\tau_2)\}d\tau_1 d\tau_2$$

$$= \int_0^\infty\int_0^\infty \Gamma_t(t_1-t_2)\Gamma_\tau(\tau_1)\delta(\tau_1-\tau_2)\exp\{-j2\pi(f_1\tau_1 - f_2\tau_2)\}d\tau_1 d\tau_2$$

$$= \int_0^\infty \Gamma_t(t_1-t_2)\Gamma_\tau(\tau_1)\exp\{-j2\pi(f_1-f_2)\}d\tau_1$$

$$= \frac{\Gamma_t(t_1-t_2)\tau_{mp}}{1+j2\pi(f_1-f_2)\tau_{mp}}.$$

TABLE 1

Simulation Results for the Two Frequency Model

| $f_{max}$ | SNR | MP | STD | Min | Max |
|---|---|---|---|---|---|
| 60 MHz | 6 dB | 0 | 8 m | 130 m | 633 m |
| 60 MHz | 9 dB | 0 | −2 m | 123 m | 561 m |
| 60 MHz | 6 dB | 1 | 2 m | 80 m | 328 m |
| 20 MHz | 6 dB | 0 | −56 m | 334 m | 1530 m |
| 20 MHz | 9 dB | 0 | 4 m | 211 m | 801 m |
| 20 MHz | 12 dB | 0 | 4 m | 152 m | 344 m |
| 20 MHz | 6 dB | 1 | 6 m | 208 m | 921 m |
| 20 MHz | 9 dB | 1 | −21 m | 140 m | 831 m |

Table 1 shows the results of simulation of the present invention with the given parameters. The frequency $f_{max}$ is selected as described above as $f_{min}+f_{m,0}(I-1)$. SNR is the signal to noise ratio. MP=0 indicates Rayleigh fading and MP=1 indicates Rice Fading. STD is the standard deviation (one σ), and the resolving power of the algorithm is given as minimums (Min) and maximums (Max).

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A differential ranging mobile transmitter location system, comprising:
   a mobile transmitter having a unique identifier, and having a transmitter for simultaneously sending a first frequency-hopped spread spectrum carrier signal and a second frequency-hopped spread spectrum carrier signal, at least one of which containing the unique identifier, the first frequency-hopped spread spectrum carrier having a different frequency than the second frequency-hopped spread spectrum carrier signal;
   a first base station having an antenna operable for receiving the first and second frequency-hopped spread spectrum carrier signals and capable of determining a first time of arrival of the frequency-hopped spread spectrum carrier signals;
   a second base station also having an antenna operable for receiving the first and second frequency-hopped spread spectrum carrier signals and capable of determining a second time of arrival of the frequency-hopped spread spectrum carrier signals; and
   a central station connected to the first base station and the second base station, and operable for:
   1.) receiving the first time of arrival of the first and second frequency-hopped spread· spectrum carrier signals from the first base station;
   2.) receiving the second time of arrival of the first and second frequency-hopped spread spectrum carrier signals from the second base station;
   3.) generating a first hyperbolic plot based on the differential time of arrival of the first and second frequency-hopped spread spectrum carrier signals at the first and second base stations; and
   4.) using a third information source to determine the location of the transmitter along the first hyperboplic plot.

2. The mobile location system according to claim 1 wherein a reference station operates periodically to transmit a reference first and second frequency-hopped spread spectrum carrier signal from a known location to calibrate the first and second base stations and the central station.

3. The mobile location system according to claim 1 wherein the first base station and the second base station both include atomic clocks to synchronize the time of arrival calculations.

4. The mobile location system according to claim 1 wherein the third information source is a geographic map of the area around the base stations which provides information on the probable location of the transmitter along the first hyperbolic plot.

5. The mobile location system according to claim 1 wherein the third information source is a third base station which calculates the time of arrival of the first and second frequency-hopped spread spectrum carrier signals and wherein the base station generates a second hyperbolic plot to intersect the first hyperbolic plot to identify the location of the transmitter.

6. The mobile location system according to claim 1 wherein the transmitter transmits a plurality of hops each having a different first and second frequency-hopped spread spectrum carrier signals and the time of arrival is determined by
   a.) calculating the phase difference between the first and second frequency-hopped spread spectrum carrier signals for each of the plurality of hops to produce a plurality of phase differentials; and
   b.) performing an Inverse Fourier Transform on the plurality of phase differentials to produces a time of arrival.

7. A method of locating a mobile transmitter location, comprising the steps of:
   receiving at a first base station a dual radio carrier having two frequencies and calculating therefrom a first time of arrival of the dual carrier;
   receiving at a second base station a dual radio carrier having two frequencies and calculating therefrom a second time of arrival of the dual carrier;
   comparing the first time of arrival with the second time of arrival; and
   determining the location of the origin of the dual radio carrier by hyperbolic intersection location.

\* \* \* \* \*